United States Patent
Bishop et al.

(10) Patent No.: US 11,226,459 B2
(45) Date of Patent: Jan. 18, 2022

(54) INTEGRATED PHOTONICS DEVICE HAVING INTEGRATED EDGE OUTCOUPLERS

(71) Applicant: Apple Inc., Cupertino, CA (US)

(72) Inventors: Michael J. Bishop, San Carlos, CA (US); Vijay M. Iyer, Mountain View, CA (US); Jason S. Pelc, Sunnyvale, CA (US); Mario J. Costello, San Jose, CA (US)

(*) Notice: Subject to any disclaimer, the term of this patent is extended or adjusted under 35 U.S.C. 154(b) by 0 days.

(21) Appl. No.: 16/969,034

(22) PCT Filed: Feb. 13, 2019

(86) PCT No.: PCT/US2019/017842
§ 371 (c)(1),
(2) Date: Aug. 11, 2020

(87) PCT Pub. No.: WO2019/160949
PCT Pub. Date: Aug. 22, 2019

(65) Prior Publication Data
US 2021/0033805 A1 Feb. 4, 2021

Related U.S. Application Data

(60) Provisional application No. 62/630,018, filed on Feb. 13, 2018.

(51) Int. Cl.
*G02B 6/42* (2006.01)
*G01N 21/47* (2006.01)
*G01N 21/49* (2006.01)

(52) U.S. Cl.
CPC ....... *G02B 6/4268* (2013.01); *G01N 21/4785* (2013.01); *G01N 21/49* (2013.01); *G02B 6/4214* (2013.01); *G02B 6/4251* (2013.01)

(58) Field of Classification Search
CPC ................ G02B 6/4214; G02B 6/4251; G01N 21/4785; G01N 21/49
See application file for complete search history.

(56) References Cited

U.S. PATENT DOCUMENTS

| 5,287,376 A | 2/1994 | Paoli |
| 5,488,678 A | 1/1996 | Taneya |

(Continued)

FOREIGN PATENT DOCUMENTS

| EP | 1403985 | 3/2004 |
| EP | 1432045 | 6/2004 |

(Continued)

OTHER PUBLICATIONS

International Search Report and Written Opinion dated May 27, 2019, PCT/US2019/017842, 14 pages.

(Continued)

*Primary Examiner* — Dominic J Bologna
(74) *Attorney, Agent, or Firm* — Brownstein Hyatt Farber Schreck, LLP

(57) ABSTRACT

Described herein is an integrated photonics device including a light emitter, integrated edge outcoupler(s), optics, and a detector array. The device can include a hermetically sealed enclosure. The hermetic seal can reduce the amount of moisture and/or contamination that may affect the measurement, analysis, and/or the function of the individual components within the sealed enclosure. Additionally or alternatively, the hermetic seal can be used to protect the components within the enclosure from environmental contamination induced during the manufacturing, packaging, and/or shipping process. The outcoupler(s) can be formed by creating one or more pockets in the layers of a die. Outcoupler material can be formed in the pocket and, optionally, subsequent layers can be deposited on top. The edge of the die can be polished until a targeted polish plane is achieved.

(Continued)

Once the outcoupler is formed, the die can be flipped over and other components can be formed.

20 Claims, 19 Drawing Sheets

(56) References Cited

U.S. PATENT DOCUMENTS

| | | | |
|---|---|---|---|
| 5,644,667 A | 7/1997 | Tabuchi | |
| 5,742,631 A | 4/1998 | Paoli | |
| 6,122,042 A | 9/2000 | Wunderman et al. | |
| 6,330,378 B1 | 12/2001 | Forrest | |
| 6,393,185 B1 | 5/2002 | Deacon | |
| 6,465,929 B1 | 10/2002 | Levitan et al. | |
| 6,519,382 B1 | 2/2003 | Jurbergs | |
| 6,594,409 B2 | 7/2003 | Dutt et al. | |
| 6,628,686 B1 | 9/2003 | Sargent | |
| 6,628,858 B2 | 9/2003 | Zhang | |
| 6,657,723 B2 | 12/2003 | Cohen | |
| 6,795,622 B2 | 9/2004 | Forrest | |
| 6,801,679 B2 | 10/2004 | Koh | |
| 6,801,683 B2 | 10/2004 | Kanie et al. | |
| 6,823,098 B2 | 11/2004 | Guidotti et al. | |
| 6,892,449 B1 | 5/2005 | Brophy et al. | |
| 6,904,191 B2 | 6/2005 | Kubby | |
| 6,940,182 B2 | 9/2005 | Hilton et al. | |
| 6,947,639 B2 | 9/2005 | Singh | |
| 6,952,504 B2 | 10/2005 | Bi | |
| 6,987,906 B2 | 1/2006 | Nakama et al. | |
| 7,054,517 B2 | 5/2006 | Mossberg | |
| 7,058,245 B2 | 6/2006 | Farahi | |
| 7,079,715 B2 | 7/2006 | Kish | |
| 7,085,445 B2 | 8/2006 | Koh | |
| 7,203,401 B2 | 4/2007 | Mossberg | |
| 7,209,611 B2 | 4/2007 | Joyner | |
| 7,245,379 B2 | 7/2007 | Schwabe | |
| 7,283,694 B2 | 10/2007 | Welch | |
| 7,314,451 B2 | 1/2008 | Halperin et al. | |
| 7,324,195 B2 | 1/2008 | Packirisamy et al. | |
| 7,366,364 B2 | 4/2008 | Singh | |
| 7,447,393 B2 | 11/2008 | Yan | |
| 7,460,742 B2 | 12/2008 | Joyner | |
| 7,477,384 B2 | 1/2009 | Schwabe | |
| 7,483,599 B2 | 1/2009 | Dominic et al. | |
| 7,526,007 B2 | 4/2009 | Chua et al. | |
| 7,558,301 B2 | 7/2009 | Lin et al. | |
| 7,680,364 B2 | 3/2010 | Nilsson | |
| 7,720,328 B2 | 5/2010 | Yan | |
| 7,885,302 B2 | 2/2011 | Eberhard | |
| 7,885,492 B2 | 2/2011 | Welch | |
| 7,974,504 B2 | 7/2011 | Nagarajan | |
| 8,300,994 B2 | 10/2012 | Welch et al. | |
| 8,559,775 B2 | 10/2013 | Babie et al. | |
| 8,564,784 B2 | 10/2013 | Wang et al. | |
| 8,724,100 B1 | 5/2014 | Asghari et al. | |
| 8,920,332 B2 | 12/2014 | Hong et al. | |
| 8,983,250 B2 | 3/2015 | Black et al. | |
| 9,020,004 B2 | 4/2015 | Jeong | |
| 9,031,412 B2 | 5/2015 | Nagarajan | |
| 9,110,259 B1 | 8/2015 | Black | |
| 9,135,397 B2 | 9/2015 | Denyer et al. | |
| 9,176,282 B2 | 11/2015 | Pottier | |
| 9,217,669 B2 | 12/2015 | Wu et al. | |
| 9,348,154 B2 | 5/2016 | Hayakawa | |
| 9,370,689 B2 | 6/2016 | Guillama et al. | |
| 9,405,066 B2 | 8/2016 | Mahgerefteh | |
| 9,543,736 B1 | 1/2017 | Barwicz et al. | |
| 9,620,931 B2 | 4/2017 | Tanaka | |
| 9,766,370 B2 | 9/2017 | Aloe et al. | |
| 9,829,631 B2 | 11/2017 | Lambert | |
| 9,880,352 B2 | 1/2018 | Florjanczyk | |
| 9,943,237 B2 | 4/2018 | Baker et al. | |
| 9,948,063 B2 | 4/2018 | Caneau et al. | |
| 10,009,668 B2 | 6/2018 | Liboiron-Ladouceur | |
| 10,046,229 B2 | 8/2018 | Tran et al. | |
| 10,203,762 B2 | 2/2019 | Bradski et al. | |
| 10,238,351 B2 | 3/2019 | Halperin et al. | |
| 10,285,898 B2 | 5/2019 | Douglas et al. | |
| 10,310,196 B2 | 6/2019 | Hutchison | |
| 10,529,003 B2 | 1/2020 | Mazed | |
| 10,687,718 B2 | 6/2020 | Allec et al. | |
| 10,852,492 B1 | 12/2020 | Vermeulen et al. | |
| 2005/0053112 A1 | 3/2005 | Shams-Zadeh-Amiri | |
| 2005/0063431 A1* | 3/2005 | Gallup | G02B 6/4292 372/34 |
| 2006/0002443 A1 | 1/2006 | Farber et al. | |
| 2006/0274999 A1 | 12/2006 | Wu et al. | |
| 2008/0044128 A1 | 2/2008 | Kish et al. | |
| 2008/0310470 A1 | 12/2008 | Ooi et al. | |
| 2014/0029943 A1 | 1/2014 | Mathai et al. | |
| 2016/0091368 A1 | 3/2016 | Fish et al. | |
| 2016/0224750 A1 | 8/2016 | Kethman et al. | |
| 2016/0306111 A1* | 10/2016 | Lambert | G02B 6/125 |
| 2017/0164878 A1 | 6/2017 | Connor | |
| 2018/0364426 A1* | 12/2018 | ten Have | G02B 6/423 |
| 2019/0339468 A1 | 11/2019 | Evans | |
| 2019/0342009 A1 | 11/2019 | Evans | |
| 2020/0152615 A1 | 5/2020 | Krasulick et al. | |
| 2020/0244045 A1 | 7/2020 | Bismuto et al. | |
| 2020/0253547 A1 | 8/2020 | Harris et al. | |
| 2020/0309593 A1 | 10/2020 | Bismuto et al. | |

FOREIGN PATENT DOCUMENTS

| | | |
|---|---|---|
| JP | 2008262116 | 10/2008 |
| WO | WO 01/014929 | 3/2001 |
| WO | WO 04/031824 | 4/2004 |
| WO | WO 05/091036 | 9/2005 |
| WO | WO 11/090274 | 7/2011 |
| WO | WO 17/040431 | 3/2017 |
| WO | WO 17/184420 | 10/2017 |
| WO | WO 17/184423 | 10/2017 |
| WO | WO 19/152990 | 8/2019 |
| WO | WO 20/106974 | 5/2020 |

OTHER PUBLICATIONS

Gonzalez-Sanchez et al., "Capacitive Sensing for Non-lnvasive Breathing and Heart Monitoring in Non-Restrained, Non-Sedated Laboratory Mice," Sensors 2016, vol. 16, No. 1052, pp. 1-16.

Kybartas et al., "Capacitive Sensor for Respiratory Monitoring," Conference "Biomedical Engineering," Nov. 2015, 6 pages.

Lapedus, "Electroplating IC Packages—Tooling challenges increase as advanced packaging ramps up," *Semiconductor Engineering*, https://semiengineering.com/electroplating-ic-packages, Apr. 10, 2017, 22 pages.

Materials and Processes for Electronic Applications, Series Editor: James J. Licari, AvanTeco, Whittier, California, Elsevier Inc., 2009, 20 pages.

Worhoff et al., "Flip-chip assembly for photonic circuits," MESA+ Research Institute, University of Twente, Integrated Optical MicroSystems Group, The Netherlands, 12 pages.

U.S. Appl. No. 16/650,804, filed Mar. 25, 2020, Arbore et al.

U.S. Appl. No. 17/254,810, filed Dec. 21, 2020, Bishop et al.

Bogaerts, et al., "Off-Chip Coupling," *Handbook of Silicon Photonics*, CRC Press, Apr. 2013, 43 pages.

Chang et al., "A Comb-Drive Actuator Driven by Capacitively-Coupled-Power," *Sensors*, 2012, pp. 10881-10889.

Holmström et al., "MEMS Laser Scanners: A Review," Journal of Microelectromechanical Systems, vol. 23, No. 2, 2014, pp. 259-275.

Milanovic et al., "Compact MEMS Mirror Based Q-Switch Module for Pulse-on-demand Laser Range Finders," presented at SPIE Conference on MOEMS and Miniaturized Systems XIV, San Francisco, California, 2015, 7 pages.

Schiappelli et al., "Efficient fiber-to-waveguide coupling by a lense on the end of the optical fiber fabricated by focused ion beam milling," Microelectronic Engineering, 73-74, 2004, pp. 397-404.

(56) References Cited

OTHER PUBLICATIONS

Tsai et al., "A Laminate Cantilever Waveguide Optical Switch," 2012, downloaded Sep. 19, 2021 from IEEE Xplore, pp. 203-207.

* cited by examiner

INTEGRATED PHOTONICS DEVICE HAVING INTEGRATED EDGE OUTCOUPLERS

CROSS REFERENCE OF RELATED APPLICATIONS

This application is a national phase application under 35 U.S.C. § 371 of PCT Application PCT/US2019/017842, filed Feb. 13, 2019, which claims benefit of U.S. Provisional Patent Application No. 62/630,018, filed on Feb. 13, 2018, which are hereby incorporated by reference as if fully disclosed herein.

FIELD OF DISCLOSURE

This relates generally to an integrated photonics device configured for measuring one or more properties of a sample volume. More specifically, the integrated photonics device can include integrated edge outcouplers.

BACKGROUND

One application for optical sensing systems can be to measure one or more properties of a sample volume. The optical sensing system can include an integrated photonics device including a plurality of optical components such as light sources and detectors. The placement and alignment accuracy of the light sources and detectors relative to each other can affect the accuracy of the measurement. For example, the alignment of the optical components can affect the accuracy of the selective detection of return light measured by the detectors that have a certain path length.

SUMMARY

Described herein is an integrated photonics device for determining one or more properties of a measured sample volume. The integrated photonics device can include a light emitter configured to emit light through a waveguide formed by a plurality of layers. The light can propagate through the waveguide to one or more integrated edge outcouplers. The integrated edge outcoupler can redirect the light to emission optics, which can then collimate, focus, and/or direct the light to an emission region located on an external surface of the device. The light can interact with material included in a measured sample volume. The light can undergo one or more scattering events in the measured sample volume, where the scattering event(s) can cause the light to return to the device. The return light can enter into the device via one or more windows. Detection/collection optics can be used to collimate, focus, and/or direct the return light to the detector array. A detector may also be attached to the supporting material above the outcoupler and attached directly to the outcoupler. The detector array can generate a plurality of signals to be analyzed by a controller or processor for determining one or more properties of the measured sample volume.

The integrated photonics device can include a hermetically sealed enclosure, which can include optical components, electrical components, and/or thermal components. For example, the optical components can include the emission and detection optics and the detector array. The hermetic seal can reduce the amount of moisture and/or contamination that may affect the measurement, analysis, and/or the function of the individual components within the sealed enclosure. Additionally or alternatively, the hermetic seal can be used to protect the components within the enclosure from environmental contamination induced during the manufacturing, packaging, and/or shipping process. The electrical components can include one or more layers disposed on a supporting layer and configured to route electrical signals from the optical components to regions outside of the hermetic seal. The thermal components can include, but are not limited to, one or more passive thermal slugs and active thermoelectric devices configured to relocate heat generated by the optical components to the system interface of the device.

The integrated photonics device can also include an integrated edge outcoupler. The integrated edge outcoupler can be formed by creating one or more pockets in the layers of a die. Outcoupler material can be formed in the pocket and, optionally, subsequent layers can be deposited on top of the outcoupler material. The edge of the die can be polished until a targeted polish plane is achieved to form the outcoupler. Once the outcoupler is formed, the die can be flipped over and other components can be formed. Once the other components are formed, a frame can be bonded to the supporting layer, and a hermetic seal can be formed.

DETAILED DESCRIPTION

Figure 1A:
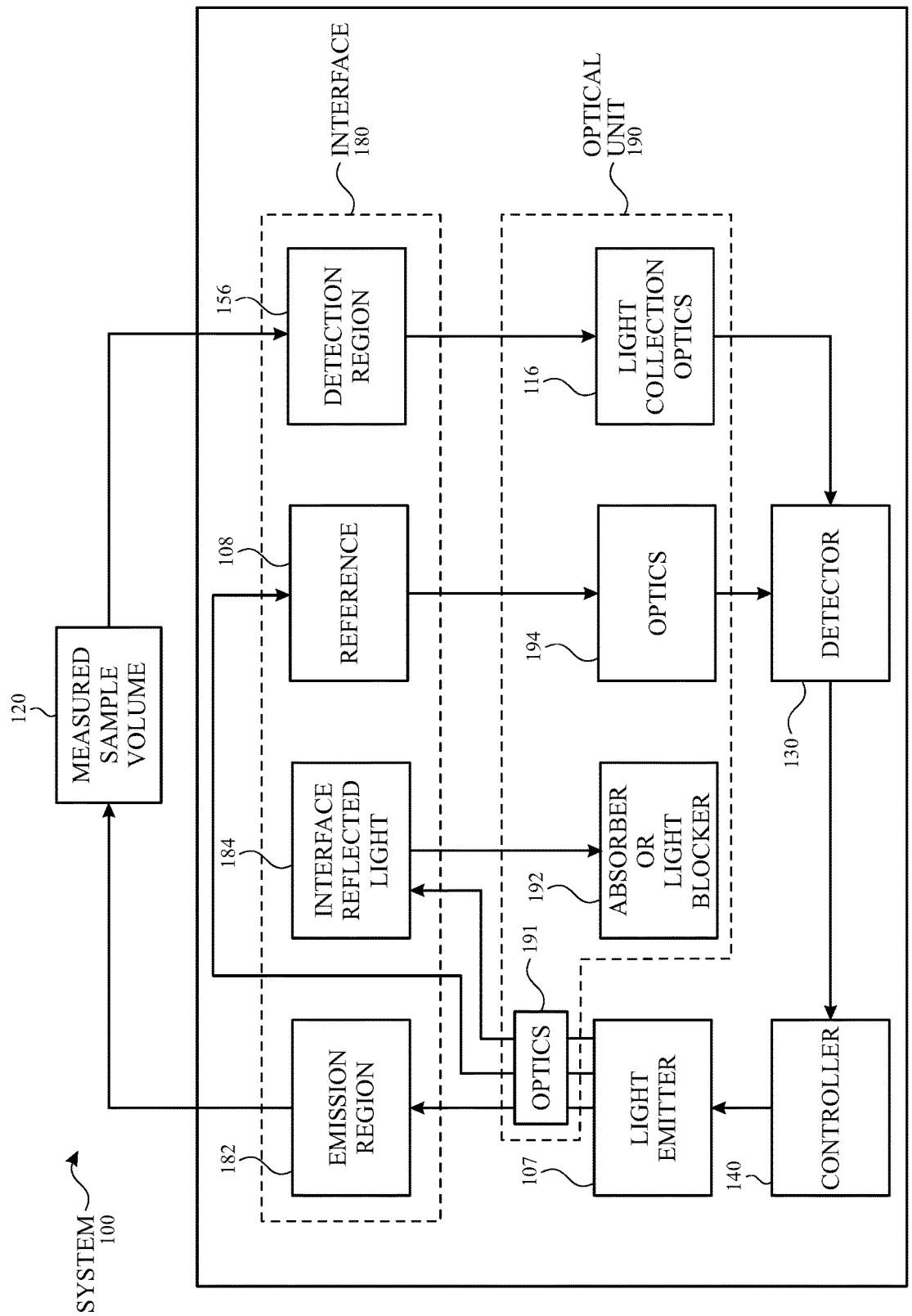
FIG. 1A illustrates a block diagram of an exemplary optical sensing system according to examples of the disclosure.

In the following description of examples, reference is made to the accompanying drawings in which it is shown by way of illustration specific examples that can be practiced. It is to be understood that other examples can be used and structural changes can be made without departing from the scope of the various examples.

Various techniques and process flow steps will be described in detail with reference to examples as illustrated in the accompanying drawings. In the following description, numerous specific details are set forth in order to provide a thorough understanding of one or more aspects and/or features described or referenced herein. It will be apparent, however, to one skilled in the art, that one or more aspects and/or features described or referenced herein may be practiced without some or all of these specific details. In other instances, well-known process steps and/or structures have not been described in detail in order to not obscure some of the aspects and/or features described or referenced herein.

Further, although process steps or method steps can be described in a sequential order, such processes and methods can be configured to work in any suitable order. In other words, any sequence or order of steps that can be described in the disclosure does not, in and of itself, indicate a requirement that the steps be performed in that order. Further, some steps may be performed simultaneously despite being described or implied as occurring non-simultaneously (e.g., because one step is described after the other step). Moreover, the illustration of a process by its description in a drawing does not imply that the illustrated process is exclusive of other variations and modification thereto, does not imply that the illustrated process or any of its steps are necessary to one or more of the examples, and does not imply that the illustrated process is preferred.

Described here is an integrated photonics device for determining one or more properties of a measured sample volume. The integrated photonics device can include a light emitter configured to emit light through a waveguide formed by a plurality of layers. The light can propagate through the waveguide to one or more integrated edge outcouplers. The integrated edge outcoupler can redirect the light to emission optics, which can then collimate, focus, and/or direct the light to an emission region located on an external surface of the device. The light can interact with material included in a measured sample volume. The light can undergo one or more scattering events in the measured sample volume, where the scattering event(s) can cause the light to return to the device. The return light can enter into the device via one or more windows. Detection optics can be used to collimate, focus, and/or direct the return light to the detector array. The detector array can generate a plurality of signals to be analyzed by a controller or processor for determining one or more properties of the measured sample volume.

The integrated photonics device can include a hermetically sealed enclosure, which can include optical components, electrical components, and/or thermal components. For example, the optical components can include the emission and detection optics and the detector array. The hermetic seal can reduce the amount of moisture and/or contamination that may affect the measurement, analysis and/or the function of the individual components within the sealed enclosure. Additionally or alternatively, the hermetic seal can be used to protect the components within the enclosure from environmental contamination induced during the manufacturing, packaging, and/or shipping process. The electrical components can include one or more layers disposed on a supporting layer and configured to route electrical signals from the optical components to regions outside of the hermetic seal. The thermal components can include one or more thermal slugs configured to relocate heat generated by the optical components to the system interface of the device.

The integrated photonics device can also include an integrated edge outcoupler. The integrated edge outcoupler can be formed by creating one or more pockets in the layers of a die. Outcoupler material can be formed in the pocket, and optionally, subsequent layers can be deposited on top of the outcoupler material. The edge of the die can be polished until a targeted polish plane is achieved to form the outcoupler. Once the outcoupler is formed, the die can be flipped over and other components can be formed. Once the other components are formed, a frame can be bonded to the supporting layer, and a hermetic seal can be formed.

Figure 1B:
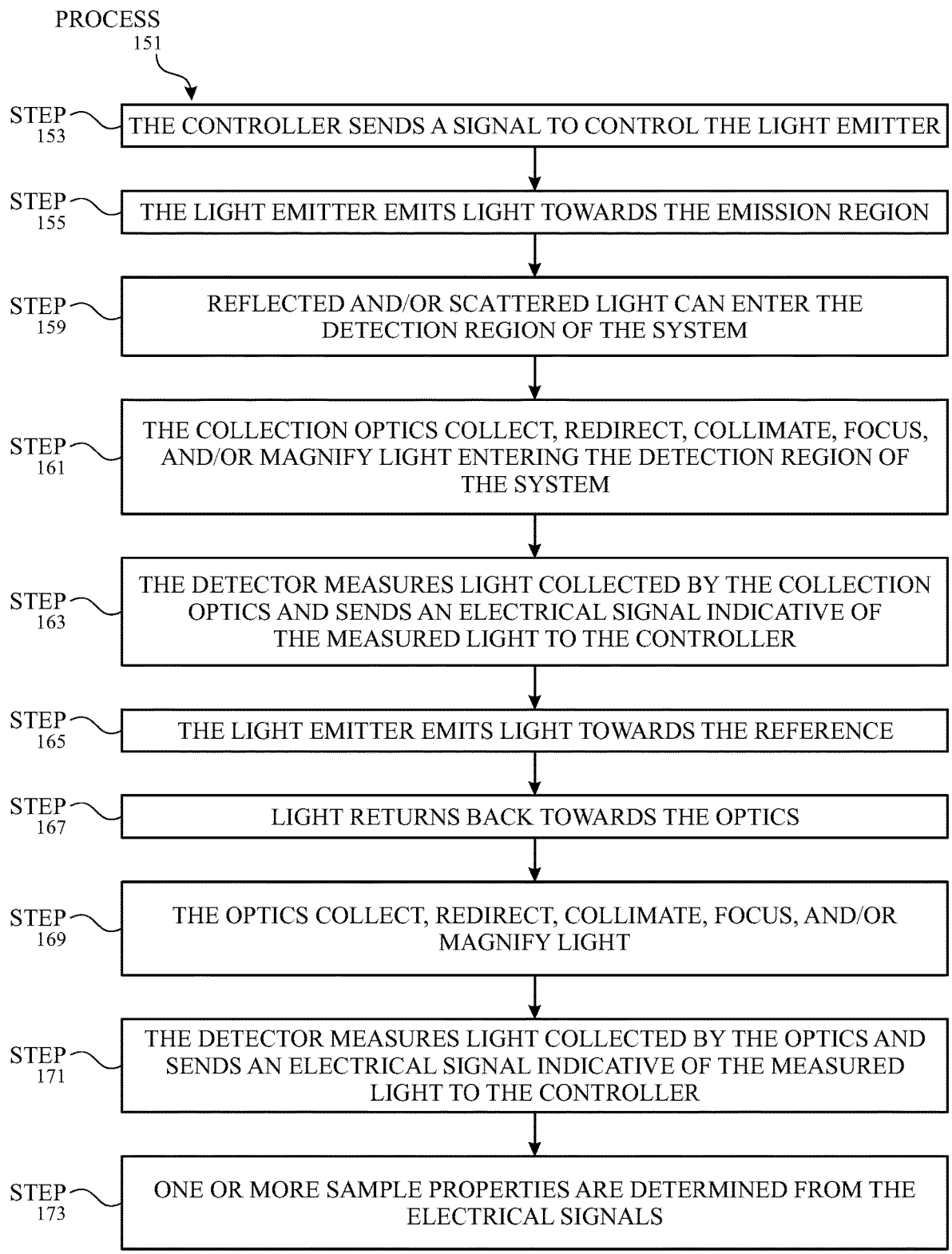
FIG. 1B illustrates an exemplary process flow for measuring sample properties according to examples of the disclosure.

An overview of the components included in an exemplary integrated photonics device and operation thereof are now described, with detailed descriptions provided below. FIG. 1A illustrates a block diagram of an exemplary optical sensing system according to examples of the disclosure. FIG. 1B illustrates an exemplary process flow for measuring sample properties according to examples of the disclosure. The system 100 can include an interface 180 (e.g., a system interface), an optical unit 190, a light emitter 107, a detector 130, and a controller 140. The system 100 can include an integrated photonics device, and the interface 180 can include an external surface of the device, which can accommodate light transmission through it, among other things. The interface 180 can include an emission region 182, a reference 108 (optional), and a detection region 156. In some examples, the emission region 182 can include one or more components (e.g., an aperture layer) configured to limit the optical path lengths and/or angles of light entering the system 100. By limiting the optical path lengths and/or angles of light, the light incident on, or exiting from, a measured sample volume 120 can also be limited. Optical unit 190 can include an absorber or light blocker 192, optics 191 (e.g., lenses), optics 194 (e.g., a negative microlens), and light collection optics 116 (e.g., a positive microlens). In using the system, the measured sample volume 120 can be located near, close to, or touching at least a portion (e.g., interface 180) of the system 100. The light emitter 107 can be coupled to the controller 140. The controller 140 can send a signal (e.g., current or voltage waveform) to control the light emitter 107, which can emit light (step 153 of process 150). The light emitter 107 can include a plurality of waveguides, in some examples. The light emitter 107 can emit light towards the emission region 182 (step 155 of process 151).

The emission region 182 can be configured to allow light to exit the system 100 towards the measured sample volume 120. Depending on the nature of the measured sample volume 120, light can penetrate a certain depth into the measured sample volume 120 to reach one or more scattering sites and can return (e.g., reflect and/or scatter back)

towards the system 100. The return light can enter back into the system 100 at the detection region 156 (step 159 of process 151). The return light that enters back into the system can be collected by light collection optics 116, which can direct, collimate, focus, and/or magnify the return light (step 161 of process 151). The return light can be directed towards the detector 130 (e.g., a detector array). The detector 130 can detect the return light and send an electrical signal indicative of the amount of detected light to the controller 140 (step 163 of process 151).

The light emitter 107 can optionally emit light towards the reference 108 (step 165 of process 151). The reference 108 can redirect light towards optics 194 (step 167 of process 151). The reference 108 can include, but is not limited to, a mirror, a filter, and/or a sample with known optical properties. Optics 194 can direct, collimate, focus, and/or magnify light towards the detector 130 (step 169 of process 151). The detector 130 can measure light reflected from the reference 108 and can generate an electrical signal indicative of this reflected light (step 171 of process 151). The controller can be configured to receive at least two electrical signals from the detector 130. In some instances, one electrical signal can be indicative of return light from the measured sample volume 120, and another electrical signal can be indicative of light reflected from the reference 108. The different electrical signals can be a time-multiplexed signal, for example. The electrical signal at a given instance in time can be based on whether the light is sent to the measured sample volume or the reference. In other instances, the two or more electrical signals can be received by different detector pixels simultaneously and may include different light information. The controller 140 (or another processor) can determine the properties of the sample from the electrical signals (step 173 of process 151).

In some examples, when the system is measuring the properties of the sample and the reference, light emitted from the light emitter 107 can reflect off a surface of the sample back into the system 100. Light reflected off the interior walls or components can be referred to as the interface reflected light 184. In some examples, the interface reflected light 184 could be light emitted from the light emitter 107 that has not reflected off the measured sample volume 120 or the reference 108 and can be due to light scattering within the system 100. Since the interface reflected light 184 can be unwanted, the absorber or light blocker 192 can prevent the interface reflected light 184 from being collected by optics 194 and light collection optics 116. In this manner, the system can prevent the interface reflected light 184 from being measured by the detector 130.

Figure 2A:
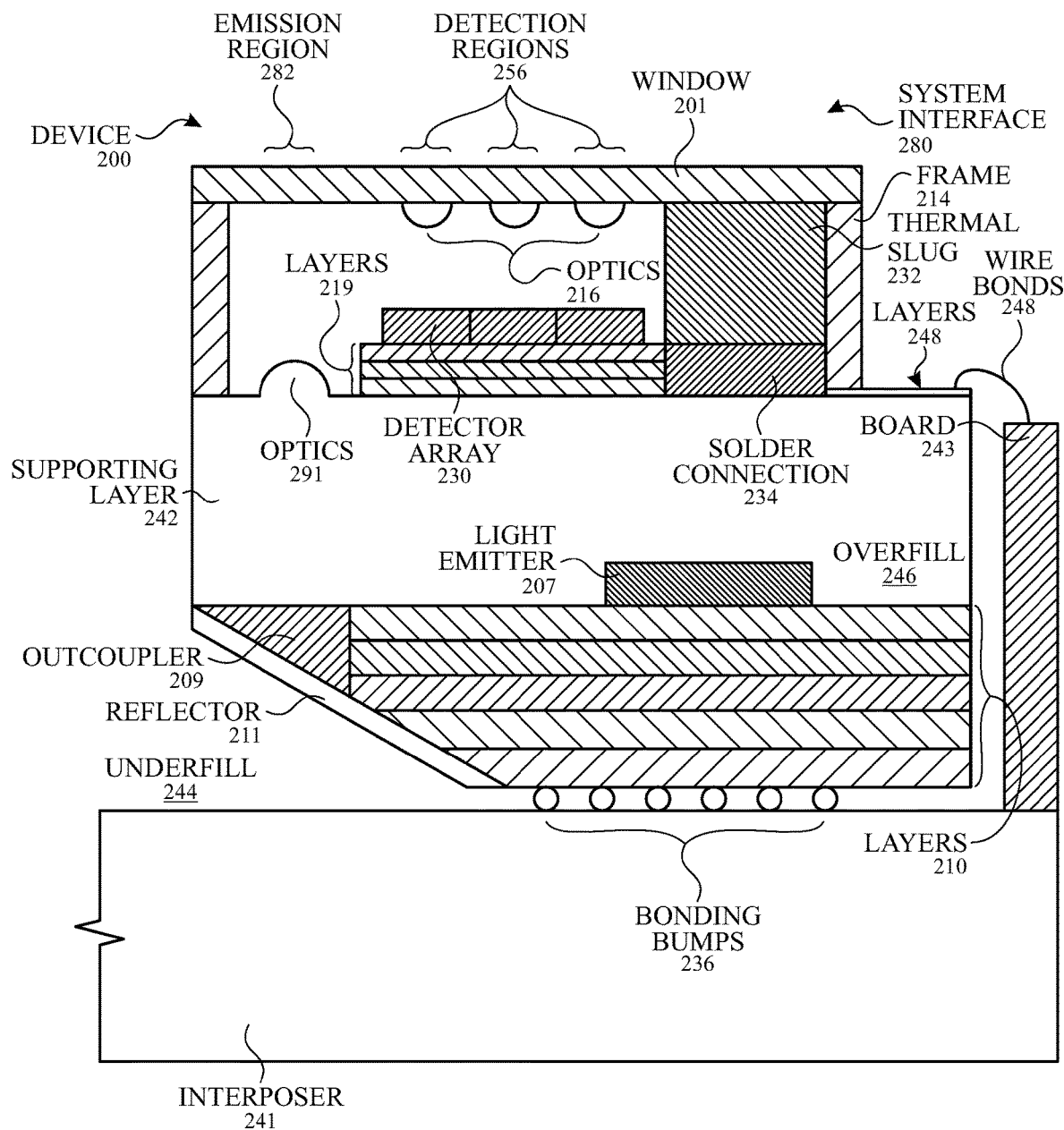
FIGS. 2A-2B illustrate cross-sectional and top views, respectively, of an exemplary portion of an integrated photonics device according to examples of the disclosure.
Figure 2B:
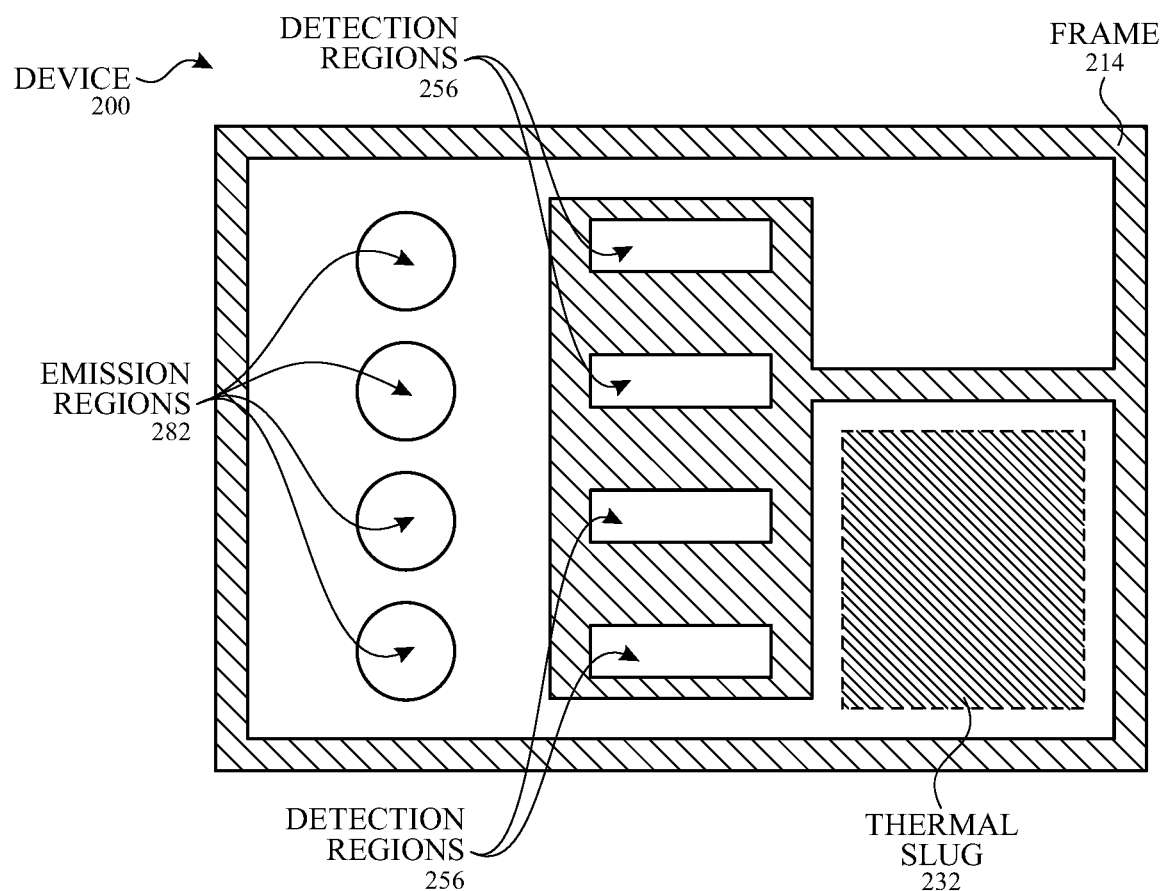

A detailed description of an exemplary integrated photonics device is now provided. FIGS. 2A-2B illustrate cross-sectional and top views, respectively, of an exemplary portion of an integrated photonics device according to examples of the disclosure. In using the device, the measured sample volume (e.g., measured sample volume 120 illustrated in FIG. 1A) can be located close to the system interface 280. The device can include one or more windows 201 located at the system interface 280. The window(s) 201 can include one or more transparent and thermally conductive materials such as sapphire, silicon, or a combination thereof.

The measured sample volume can include one or more locations, which can include one or more scattering sites associated with scattering event(s). The device 200 can be configured to reconstruct the optical paths in the measured sample volume. For example, the device 200 can be configured to reconstruct angles and locations of light received at the detection regions 256 to another place (e.g., a plane located closer to the detector array 230). Reconstruction of the optical paths can be performed using one or more layers of optics (e.g., optics 216). The device 200 can include any number of layers of optics; the one-layer of optics shown in the figure is just one example.

The device 200 can include multiple components, where the multiple components can be formed on or attached to a supporting layer 242. The supporting layer 242 can include any type of material such as silicon. At least some of the multiple components can include optical components. Exemplary optical components can include a light emitter 207, a detector array 230, optics 216, optics 291, and an outcoupler 209. Other optical components (not shown) can include optical traces, multiplexers, reflectors, and the like. The device can also include one or more electrical components, such as layer 210, layer 219, and bonding bumps 236.

The device 200 can also include a frame 214, which can be used to hermetically seal the optical components within the cavity between the supporting layer 242 and the system interface 280. The frame 214 can assist in creating the hermetic seal by being bonded to the supporting layer 242. In some examples, the frame 214 include a conductive (e.g., metal) frame. The hermetic seal can reduce the amount of water located in the cavity and/or reduce the amount of contamination in the optical paths of the light included in the measurements. In some instances, at least a portion of the frame 214 can be at a location inside the perimeter of the supporting layer 242, as shown in the figure. Bond pads (not shown) can be placed on the edge 245 of the supporting layer 242. Wire bonds 247 can be used to connect the bond pads to a board (e.g., interposer 241 or board 243) located outside of the sealed enclosure. One or more traces (e.g., included in layer 219) can be used to electrically couple the active components in the sealed enclosure to the bond pads and/or wire bonds 247, located outside of the sealed enclosure. In some examples, one or more layers 248 (dielectric layers and/or conductive layers) located between the frame 214 and the supporting layer 242 can be used for routing signals from the active components to the bond pads and/or wire bonds 247.

As discussed above, the system interface 280 can include one or more emission regions 282 and one or more detection regions 256. The emission region(s) 282 can be configured to allow light emitted by the light emitter 207 (and redirected by the outcoupler 209 and optics 291) to exit the device 200 at the system interface 280. The detection region(s) 256 can be configured to allow return light to enter the device 200 to be redirected by optics 216 and detected by the detector array 230. In some examples, certain detector pixels included in the detector array 230 can be associated with different optical path lengths to determine (e.g., estimate) the optical properties (e.g., absorbance) of the measured sample volume.

The detector array 230 can be located below (i.e., opposite the system interface 280) the optics 216. In some examples, the optics 216 can be formed from the same material as the window(s) 201. Between the detector array 230 and the optics 216, the device 200 can include air, vacuum, or any medium with a refractive index that contrasts the refractive indices of the optics 216. As discussed below, in some examples, the medium can include a thermal slug.

The device 200 can include one or more light emitters 207. A light emitter 207 can be configured to emit light. The light emitter 207 can include any type of light source (including one or more waveguides (not shown)) capable of generating light. In some instances, the light emitter 206 can include a single light source. In other instances, the light emitter 207 can include a plurality of discrete light sources. A light source can include, but is not limited to, a lamp, laser, light-emitting diode (LED), organic light-emitting diode (OLED), electroluminescent (EL) source, quantum dot (QD) light emitter, super-luminescent diode, super-continuum source, fiber-based source, or a combination of one or more of these sources. In some examples, the light emitter 207 can be capable of emitting a single wavelength of light. In some examples, the light emitter 207 can be capable of emitting a plurality of wavelengths of light. In some examples, the light emitter 207 can include any tunable source capable of generating a short-wave infrared (SWIR) signature. In some examples, a light emitter 207 can include a III-V material, such as Indium Phosphide (InP), Gallium Antimonide (GaSb), Gallium Arsenide Antimonide (GaAsSb), Aluminum Arsenide (AlAs), Aluminum Gallium Arsenide (AlGaAs), Aluminum Indium Arsenide (AnnAs), Indium Gallium Phosphide (InGaP), Indium Gallium Arsenide (InGaAs), Indium Arsenide Antimonide (InAsSb), Indium Phosphide Antimonide (InPSb), Indium Arsenide Phosphide Antimonide (InAsPSb), and Gallium Indium Arsenide Antimonide Phosphide (GaInAsSbP).

Optics 291 can be configured to redirect, collimate, and/or focus light emitted by the light emitter 207 and redirected by the outcoupler 209. Additionally, the optics 216 can be configured to redirect, collimate, and/or focus return light to be received by the detector array 230. The device can further include an outcoupler 209, which can be configured to redirect the light emitted by the light emitter 207. In some examples, the outcoupler 209 can be located on the same layer as at least one of the layers 210. For example, a side of the outcoupler 209 can contact the supporting layer 242, and a side of the layers 210 can also contact the supporting layer. Optionally, the device can include a reflector 211 disposed on the outcoupler 209.

The device 200 can include one or more layers 210 and/or one or more layers 219. The layers 210 can include one or more conductive layers configured to route one or more signals to the light emitter 207. For example, the layers 210 can be configured to route one or more signals from a controller (e.g., controller 140 illustrated in FIG. 1A) to control the light emitter 207, which can emit light in response to the one or more signals. The layers 210 can also include one or more insulating layers. For example, the layers 210 can include multiple conductive layers electrically isolated by insulating layer(s). In some instances, the layers 210 can include one or more of encapsulation layers, passivation layers, planarizing layers, or the like. The layers 210 can be electrically connected to one or more components via bonding bumps 236. Additionally or alternatively, the one or more components can be electrically connected to other components via the interposer 241.

Additionally, the layers 219 can include one or more conductive layers configured to route one or more signals to the detector array 230. For example, the layers 219 can be configured to route one or more signals from the detector array 230 to a controller (e.g., controller 140 illustrated in FIG. 1A). The layers 219 can also include one or more insulating layers. For example, the layers 219 can include multiple conductive layers electrically isolated by insulating layer(s). In some instances, layers 219 can also include one or more of encapsulation layers, passivation layers, planarizing layers, or the like. In some instances, the layers 219 can include one or more thermoelectric materials for stabilizing the temperature of the detector array 230. In some examples, one or more layers 219 can include the same material as one or more of the layers 210. In some examples, the device 200 can include one or more wire bonds, in addition to layers 219, that can electrically connect the detector array 230 to the layers 219.

In some examples, the device can include one or more traces (not shown) that connect layers 210 and layers 219. The one or more traces can be routed out of the hermetically sealed cavity. In some instances, the device can include through-silicon vias (TSVs) (not shown) to electrically connect the layers 210 and the layers 219. In other instances, the traces can be routed to the edges of the supporting layer 242, under the frame 214, and bonded to one or more components outside of the hermetic seal (e.g., using wire bonds 247 to connect to board 243)

Additionally, the device can include one or more thermal components, such as thermal slug, a heat sink, thermoelectric device, or the like. The thermal slug 232 can be configured to relocate heat from one location in the device to another. For example, the thermal slug 232 can be used to relocate heat from the light emitter 207 to the system interface 280. The thermal slug 232 can be attached to the supporting layer 242 using the solder connection 234. In some examples, the solder connection can be an under bump metallization made from a thermally conductive material such as nickel gold. In some examples, solder connection(s) 234 can be located in locations corresponding to the light emitters 207. That is, a solder connection 234 can be located above (i.e., closer to the system interface 280) the light emitter 207 such that heat from the light emitter 207 can be relocated to the thermal slug 232 located above. In some examples, the solder connection 234 can have the same footprint as the light emitter 207. In some examples, the each light emitter 207 can have a unique solder connection 234 and a unique thermal slug 232. Additional solder connections 234 can be located in other areas of the device, e.g., to help connect frame 214 to the supporting layer 242.

The device 200 can optionally include an underfill 244 and/or overfill 246. The underfill 246 can fill the space located between the outcoupler 209 and the interposer 241. The overfill 246 can be located in the space outside of the hermetically sealed cavity and can be used to, e.g., seal any wire bonds to prevent the wire bonds from breaking.

Although the descriptions given above and below pertain to a device, examples of the disclosure can include a system having multiple devices, where different components may be located in the different devices.

Figure 3A:
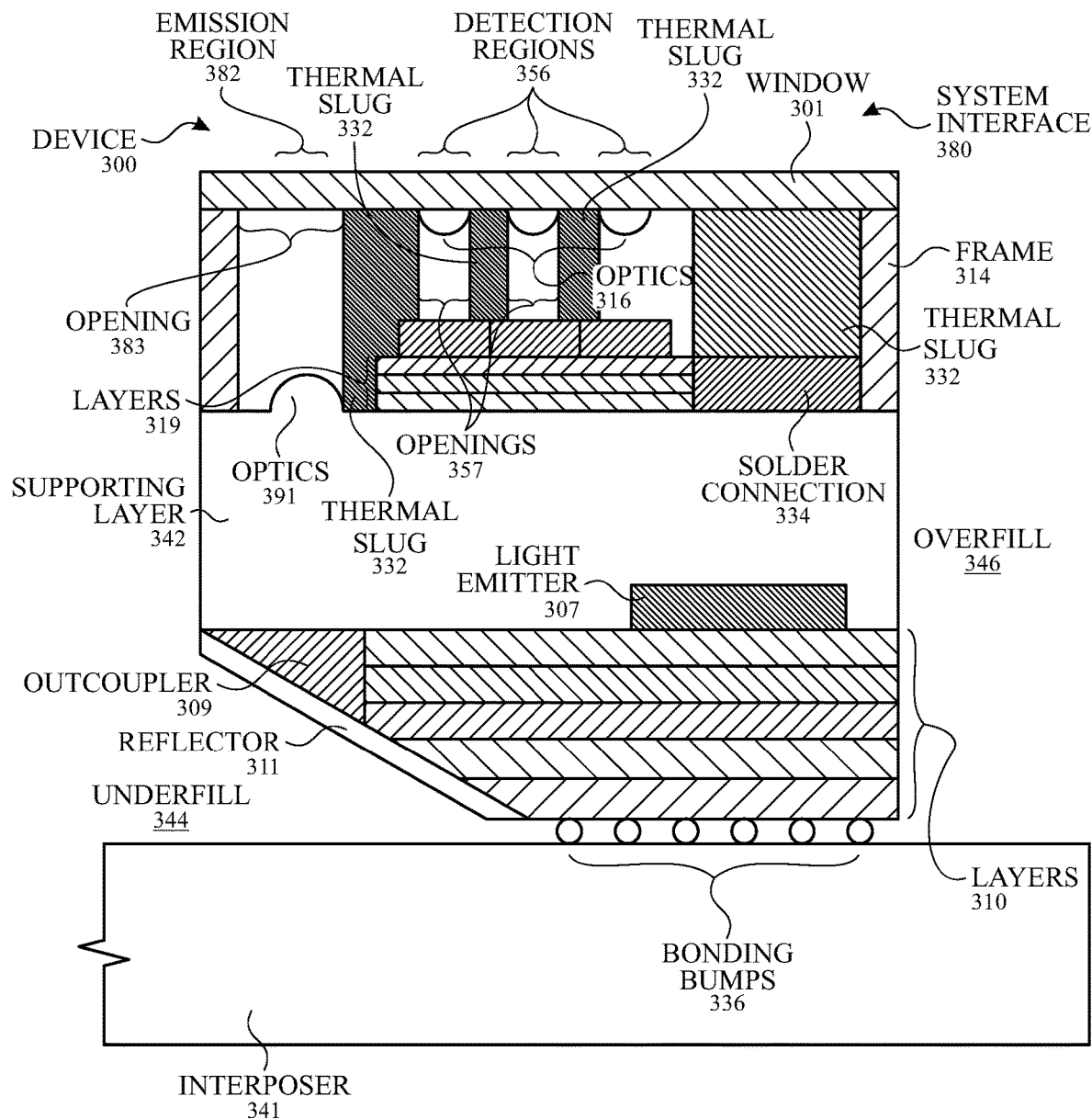
FIGS. 3A-3B illustrate cross-sectional and top views, respectively, of a thermal slug occupying the space around the optics in an integrated photonics device according to examples of the disclosure.
Figure 3B:
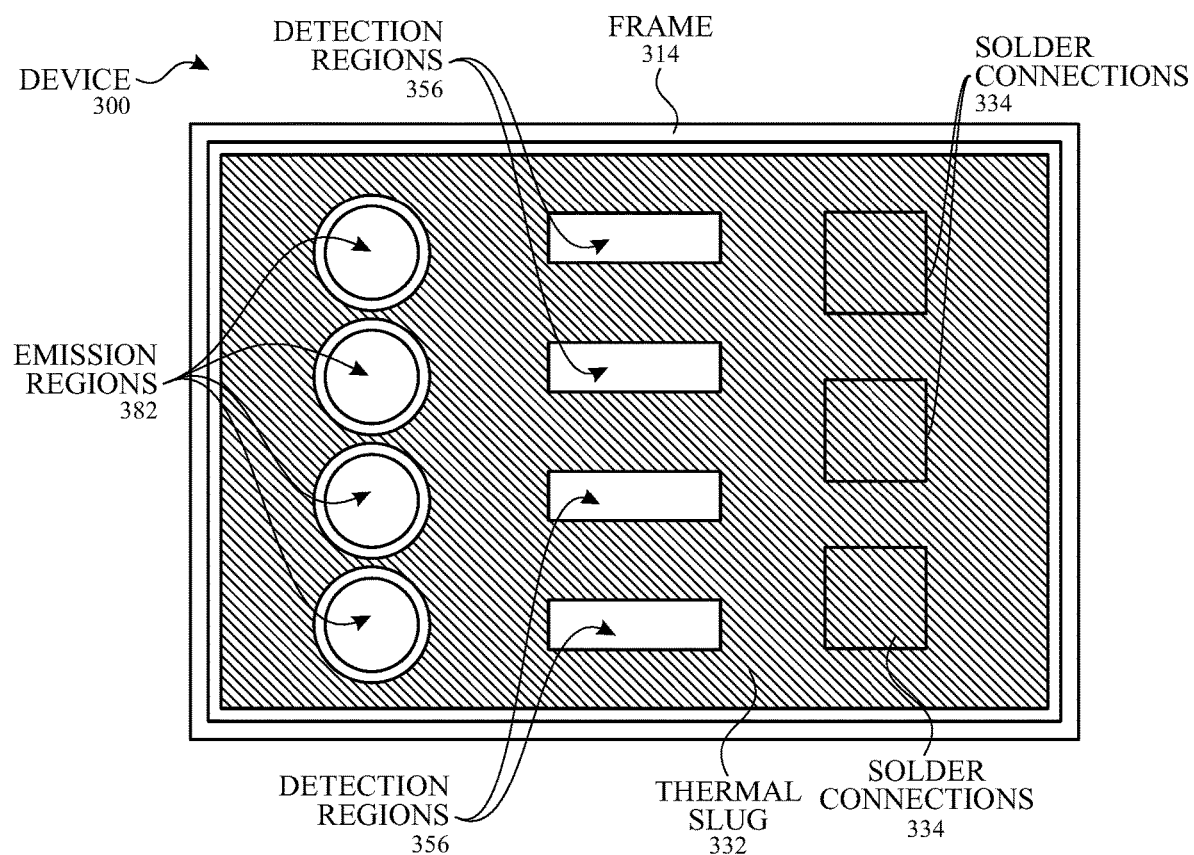

In some examples, the thermal slug included in the device can occupy the space around the optics. FIGS. 3A-3B illustrate cross-sectional and top views, respectively, of a thermal slug occupying the space around the optics in an integrated photonics device according to examples of the disclosure. Thermal slug 332 can be located around optics 316 and/or around optics 391. One or more openings can be located in the optical paths of the emitted light and/or return light. For example, the openings 357 can allow return light entering through the system interface 380 to reach the detector array 330. The openings 383 can allow emitted light from the light emitter 307 to reach the system interface 380. With the thermal slug 332 located around one or more optics, the thermal slug 332 can relocate the heat from one or more components (e.g., the light emitter(s) 307) to the window 301. In some examples, a light absorbing material can be deposited on the thermal slug 332 to help block/absorb unwanted light rays. The light absorber material can be an infrared absorbing material, for example.

In the above-described examples, the devices can include one or more thermally conductive adhesive materials (e.g., an epoxy) that bonds the thermal slug to another component. For example, a thermally conductive epoxy can be used to bond the window 201 to thermal slug 232 in device 200 illustrated in FIG. 2A. Similarly, a thermally conductive epoxy can be used to bond the thermal slug 332 to supporting layer 342 in device 300 illustrated in FIG. 3A. In some examples, the solder connection 334 can include the thermally conductive epoxy. In some examples, the same type of material can be used to connect the thermal slug 332 to the supporting layer 342 as used to connect the thermal slug 332 to the window(s) 301.

Figure 4:
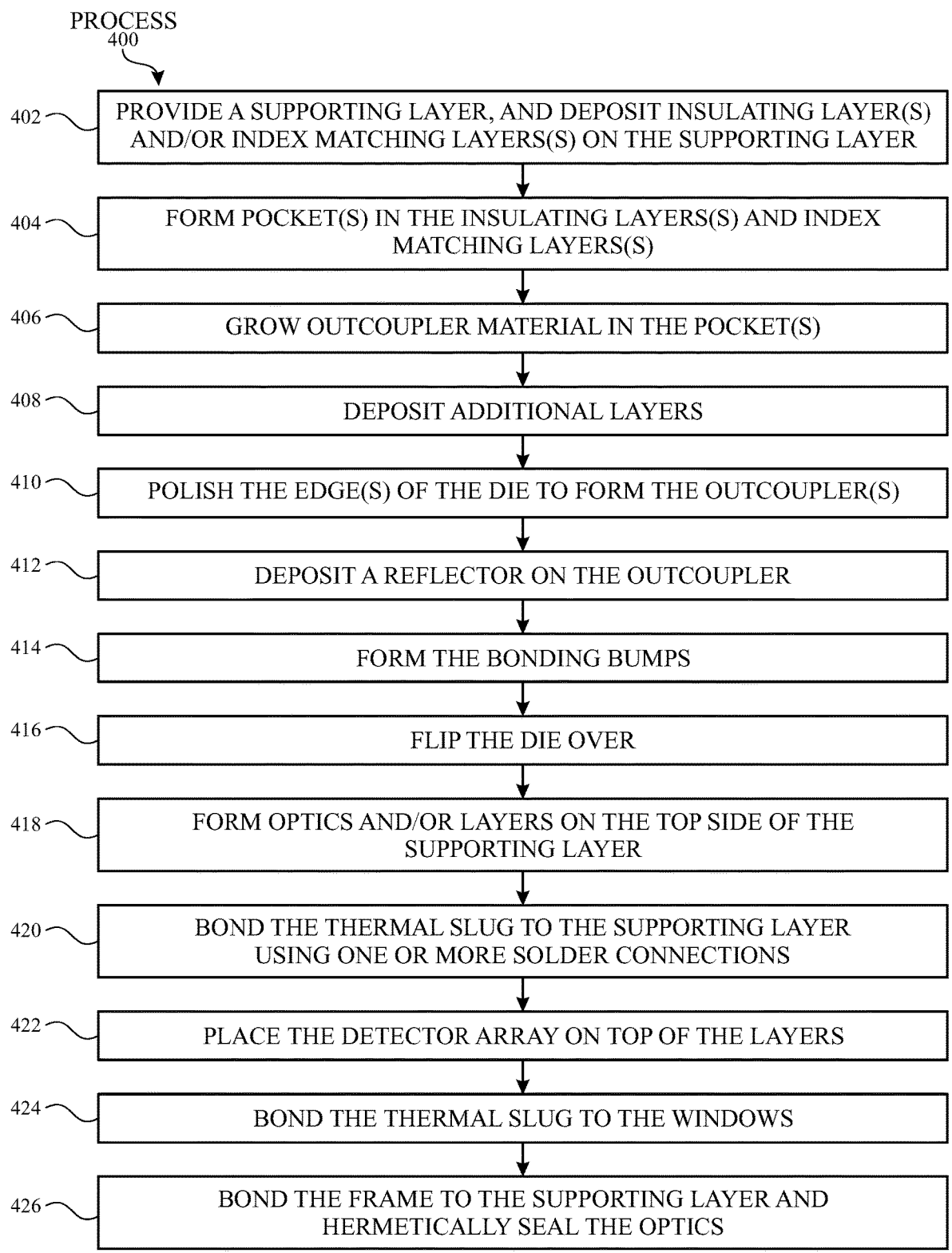
FIG. 4 illustrates an exemplary process flow for forming the integrated photonics device according to examples of the disclosure.
Figure 5A:
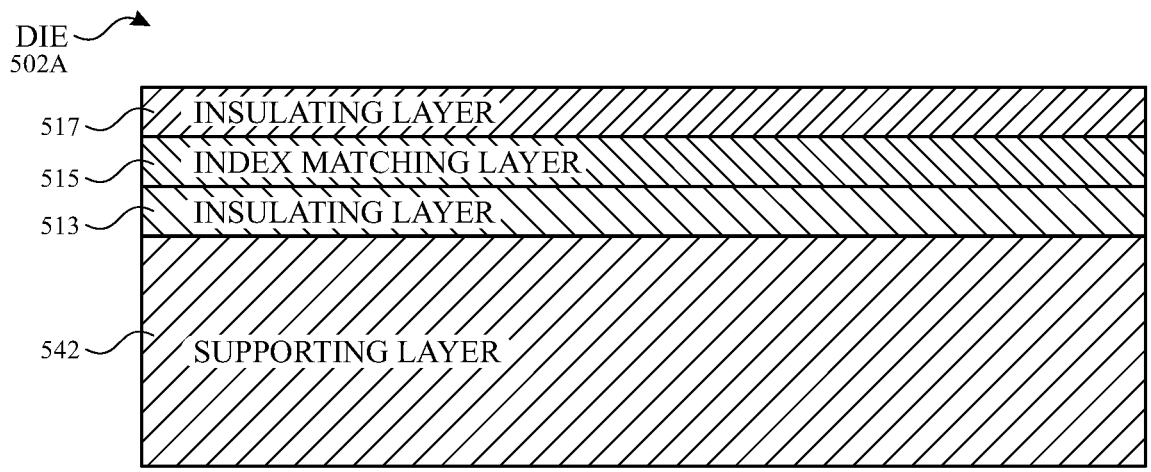
FIGS. 5A-5B illustrate cross-sectional views of an integrated photonics device during some of the steps of its formation according to examples of the disclosure.
Figure 5B:
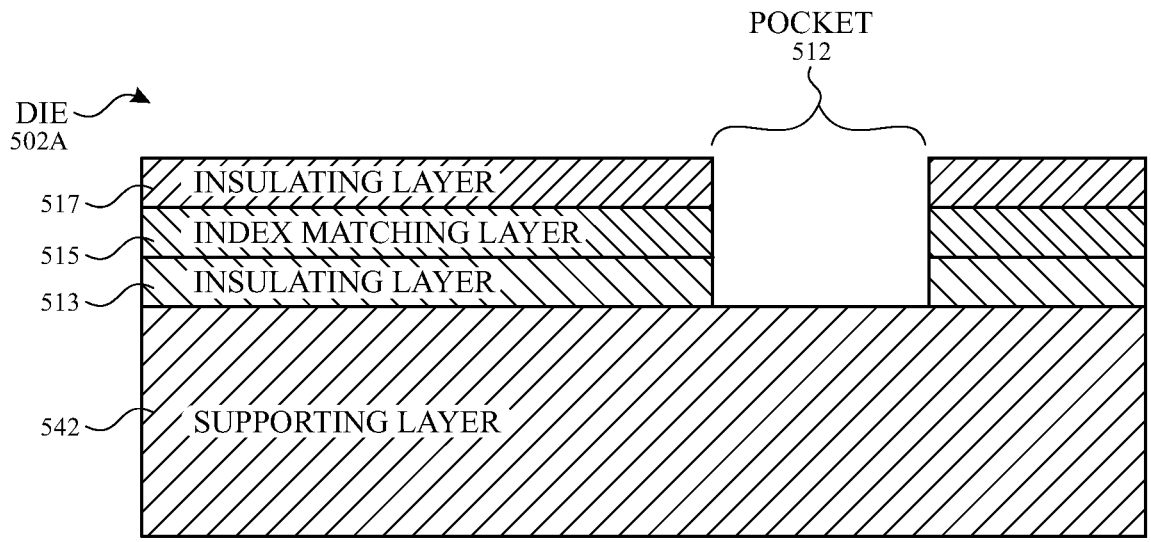

The process for forming the edge outcoupler will now be described. FIG. 4 illustrates an exemplary process flow for forming the integrated photonics device according to examples of the disclosure. FIGS. 5A-5B illustrate cross-sectional views of an integrated photonics device during some of the steps of its formation according to examples of the disclosure. Process 400 can begin by providing a support layer with one or more insulating layers and/or one or more index matching layers deposited on the supporting layer (step 402 of process 400). For example, the supporting layer provided can be supporting layer 242 illustrated in FIG. 2A. As another example, as illustrated in FIG. 5A, the die 502A can include a supporting layer 542, insulating layer 513, index matching layer 515, and insulating layer 517 deposited on the supporting layer 542. The supporting layer 542 and index matching layer 515 can include, but are not limited to including, silicon. The supporting layer 542 can, additionally or alternatively, include a material having certain properties for integrating components on one or both sides of the supporting layer. The components integrated on the side(s) of the supporting layer can include, but are not limited to, microlens arrays, optical traces, multiplexers, and the like.

In some examples, the light emitter (e.g., light emitter 207 illustrated in FIG. 2A) can be formed and/or placed in the supporting layer (e.g., supporting layer 242) prior to the layers (e.g., layers 210) being deposited. As one example, the supporting layer can be etched to form a cavity, the light source (included in the light emitter) can be placed into the cavity, the supporting layer can be etched again to form waveguides, and the layers can be deposited on top.

In some examples, the supporting layer 542 and the index matching layer 515 can form a waveguide for light to propagate. For example, the light from the light emitter (e.g., light emitter 207 illustrated in FIG. 2A) can propagate through the waveguide formed by supporting layer 542 and index matching layer 515. The insulating layer 513 and the insulating layer 517 can include, but are not limited to, $SiO_2$. One or more pockets (e.g., pocket 512 illustrated in FIG. 5B) can be formed in the supporting layer/insulating layer/index matching layer stackup (step 404 of process 400). The pocket(s) can be formed by using one or more etching techniques such as wet etching, dry etching, or the like. In some examples, forming the pocket 512 can include removing the insulating layer 513 such that the supporting layer 542 is exposed (i.e., not covered by insulating layer 513). In this manner, an etalon-free (e.g., a broadband etalon-free) outcoupler can be subsequently formed.

An outcoupler material (e.g., outcoupler material 515 illustrated in FIG. 5C) can be grown in the pocket(s) (e.g., pocket 512 illustrated in FIG. 5B) (step 406 of process 400). The outcoupler material 515 can be grown using any number of growth or deposition techniques such as a chemical vapor deposition (CVD), molecular beam epitaxy (MBE), atomic layer deposition (ALD), sputtering, and the like. The outcoupler material 515 can be any material that matches the refractive index of the supporting layer 542. An exemplary material includes, but is not limited to, amorphous silicon.

Figure 5C:
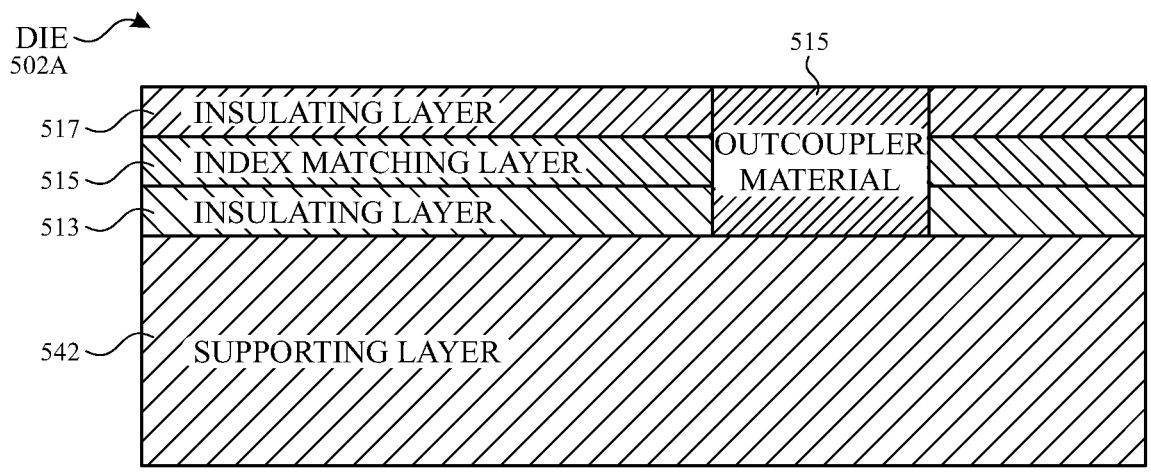
FIGS. 5C-5D illustrate cross-sectional and top views, respectively, of an exemplary die after outcoupler material is formed in the pockets according to examples of the disclosure.
Figure 5D:
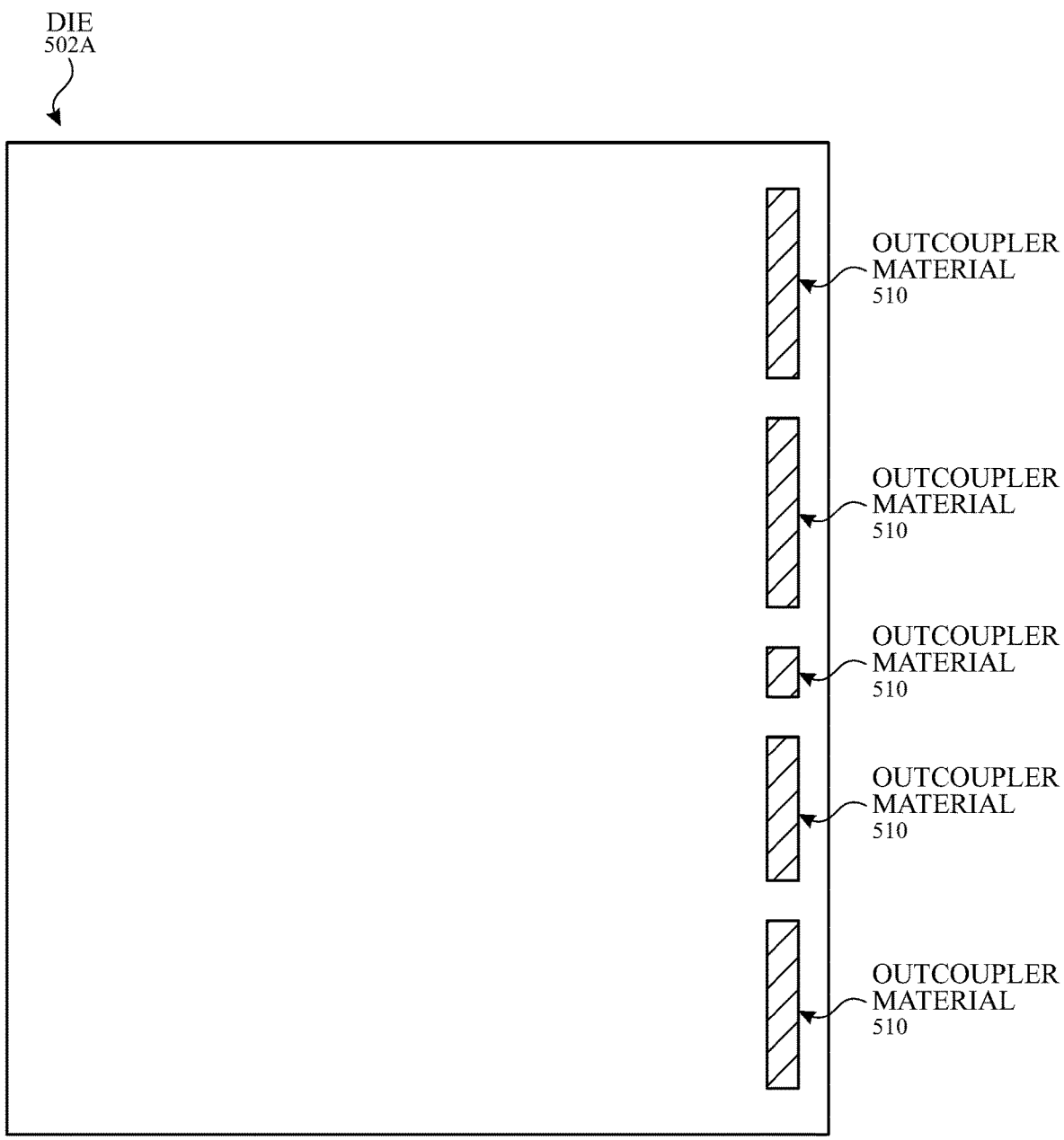
Figure 5E:
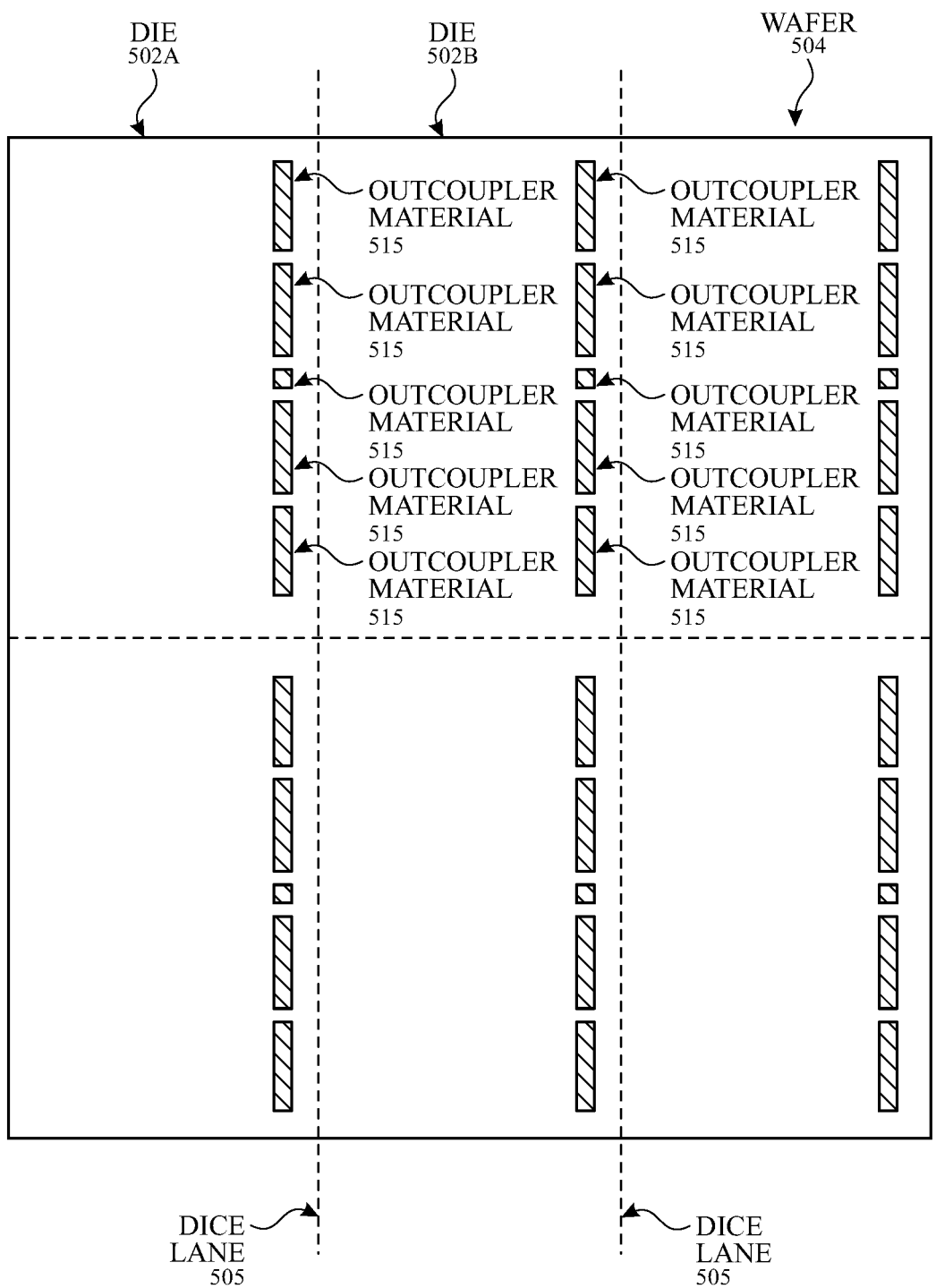
FIG. 5E illustrates a top view of an exemplary wafer having multiple dies according to examples of the disclosure.

FIGS. 5C-5D illustrate cross-sectional and top views, respectively, of an exemplary die after outcoupler material is formed in the pockets according to examples of the disclosure. The outcoupler material 515 can be formed in the pockets of the die 502A. Although the examples of the disclosure may discuss the process flow for forming the edge outcoupler and the device using a single die, examples of the disclosure are applicable to processes for forming multiple dies on a single wafer. FIG. 5E illustrates a top view of an exemplary wafer having multiple dies according to examples of the disclosure. The wafer 504 can include multiple dies, such as die 502A and 502B. The multiple dies can be formed from the same wafer 504 and can undergo the same processing steps at the same time. For example, the outcoupler material 515 can be deposited in multiple pockets, one or more of which may belong to different dies than others. As shown in the figure, the wafer 504 can include a plurality of dice lanes 505. The dice lanes can be locations designated for dicing. In this manner, one or more steps of the process can be completed prior to dicing. The dicing step can occur at any step in the process. Additionally, examples of the disclosure are not limited to separating all of the dies via the dicing step. For example, half of the wafer may be separated (e.g., dicing along a horizontal dice lane) after step 404. The top half of the wafer may undergo separate processes (e.g., polishing the outcoupler at a 45-degree angle) than the bottom half (e.g., polishing the outcoupler at a 50-degree angle). Dies included in the top half of the wafer may then be separated (e.g., via dicing along a vertical dice lane) after a subsequent step.

In some examples, outcouplers can be located along multiple edges of a given die. For example, although FIG. 5E illustrates die 502A as including outcouplers located on the right edge of the die, examples of the disclosure can include outcouplers additionally located on other edges such as the top, left, and/or bottom edges. In some examples, a die may have different shapes and different number of edges, where outcouplers can be located on any number of the edges. For example, a die that has a pentagon shape can include any or all of the five edges having outcouplers, a die that has a hexagon shape can include any or all of the six edges having outcouplers, etc.

Figure 5F:
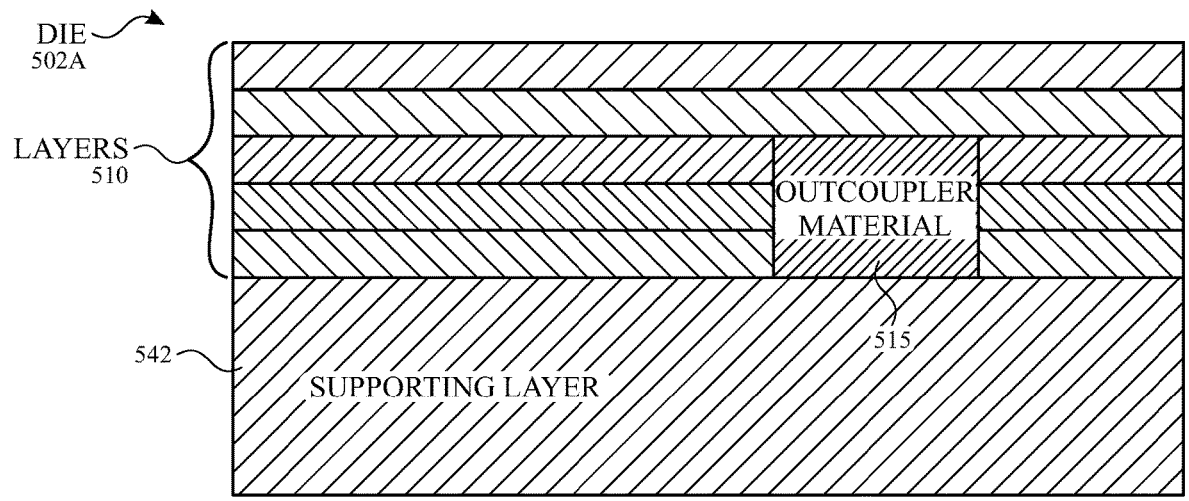
FIG. 5F illustrates a cross-sectional view of an exemplary die including additional layers deposited on top of the outcoupler material according to examples of the disclosure.

One or more additional layers may be deposited on top of the outcoupler material, as shown in FIG. 5F (step 408 of process 400). The additional layers can include one or more insulating layers, one or more conductive layers, one or more index matching layers, one or more encapsulation layers, one or more passivation layers, one or more planarizing layers, or the like. The layers will be collectively referred to as layers 510.

Figure 5G:
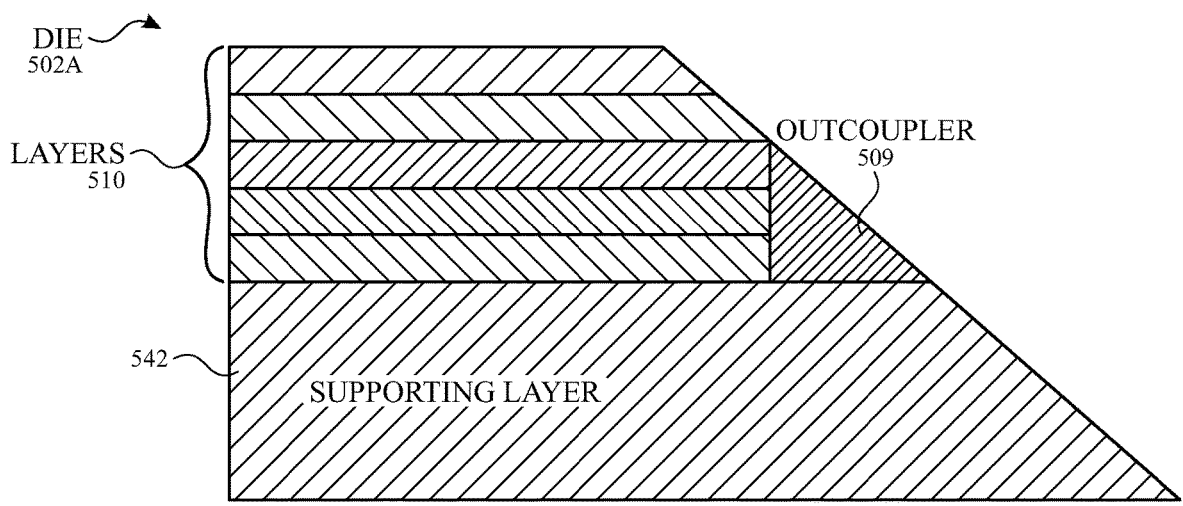
FIG. 5G illustrates a cross-sectional view of an exemplary die having a polished edge according to examples of the disclosure.

The dies can be diced along the dice lanes (e.g., dice lanes 505 illustrated in FIG. 5E), and one or more edges of one or more dies can be polished. FIG. 5G illustrates a cross-sectional view of an exemplary die having a polished edge according to examples of the disclosure. The polishing step can lead to removal of some of the outcoupler material to form the outcoupler 509 included in die 502A (step 410 of process 400). In some instances, the polishing step can also lead to removal of some of the layers 510.

In some examples, the polishing step can include polishing the outcoupler material along a targeted polish plane such that the targeted polish depth and/or polish angle is achieved, as discussed below. In some instances, the characteristics of the targeted polish plane can be based on the location of the emission region (e.g., emission region 282 illustrated in FIG. 2A), the location of the detection regions (e.g., detection regions 256 illustrated in FIG. 2A), the path length of the light (discussed below), and/or the sample properties to be measured. One example targeted polish depth can be 10 µm, although examples of the disclosure are not limited to such. One example targeted polish angle can be 45 degrees or 54.7 degrees, although examples of the disclosure are not limited to such angles.

In some examples, more than one edge of a die can be polished. In some examples, a single edge of a die can include multiple outcouplers (as shown in FIG. 5D). The multiple outcouplers along the same edge can have the same targeted polish plane. In some instances, two or more of the outcouplers along the same edge can have different targeted polish planes.

Figure 5H:
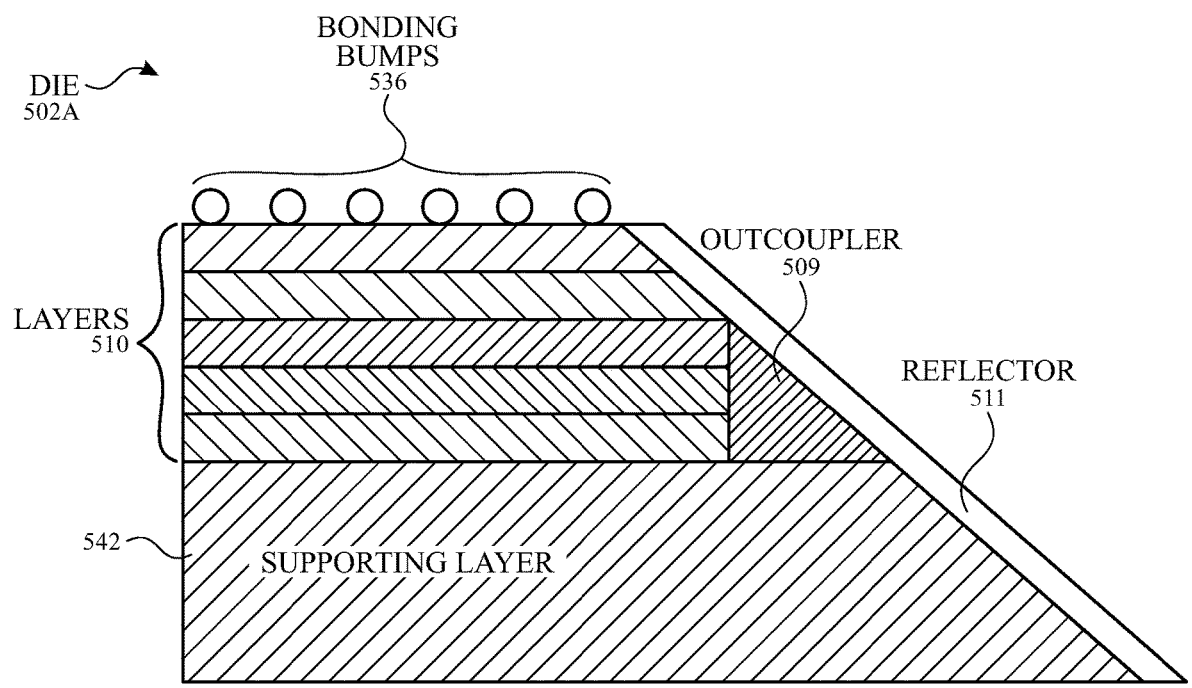
FIGS. 5H-5J illustrate cross-sectional, top, and planar views, respectively, of a die including bonding bumps formed on the layers according to examples of the disclosure.
Figure 5I:
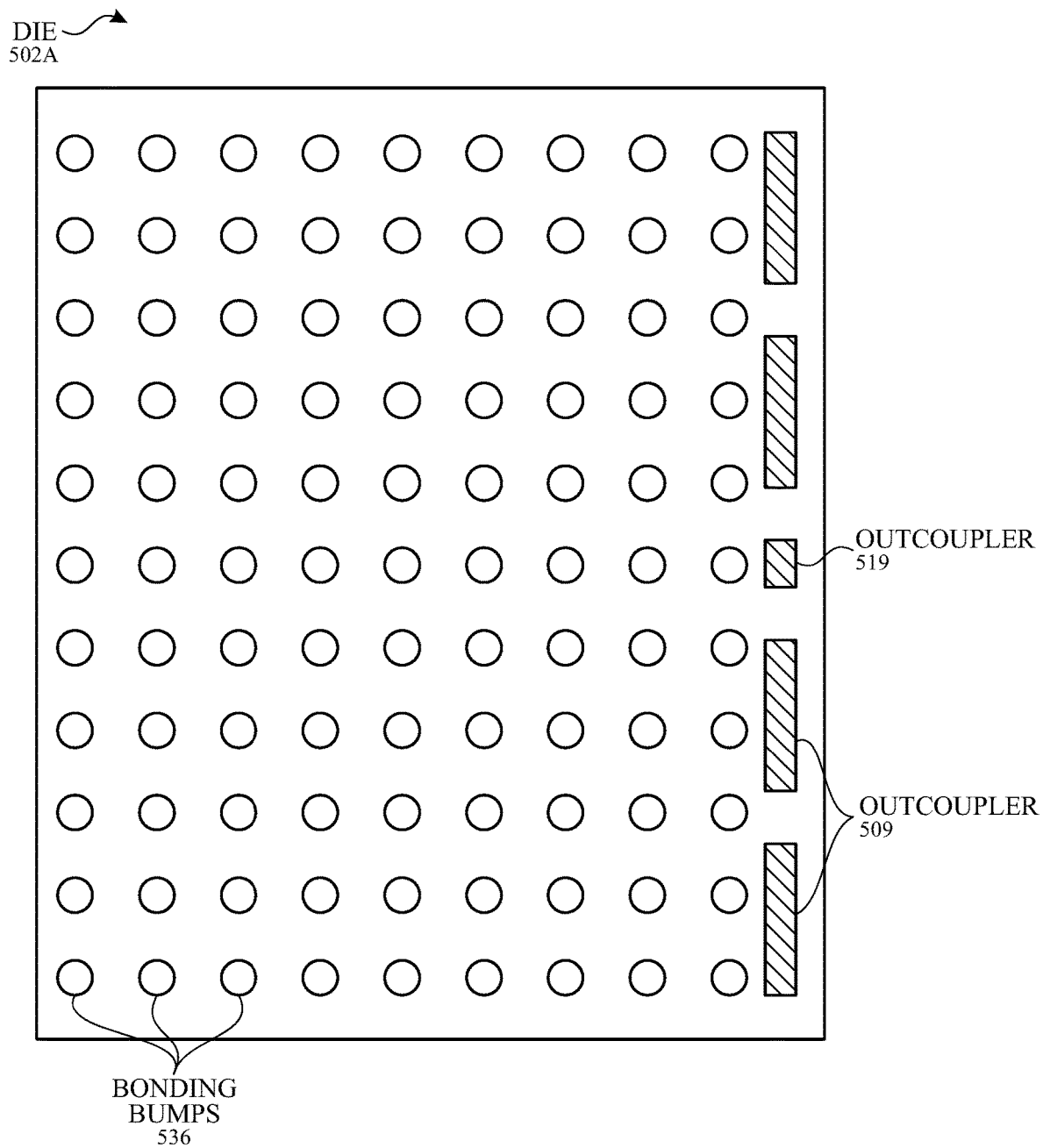
Figure 5J:
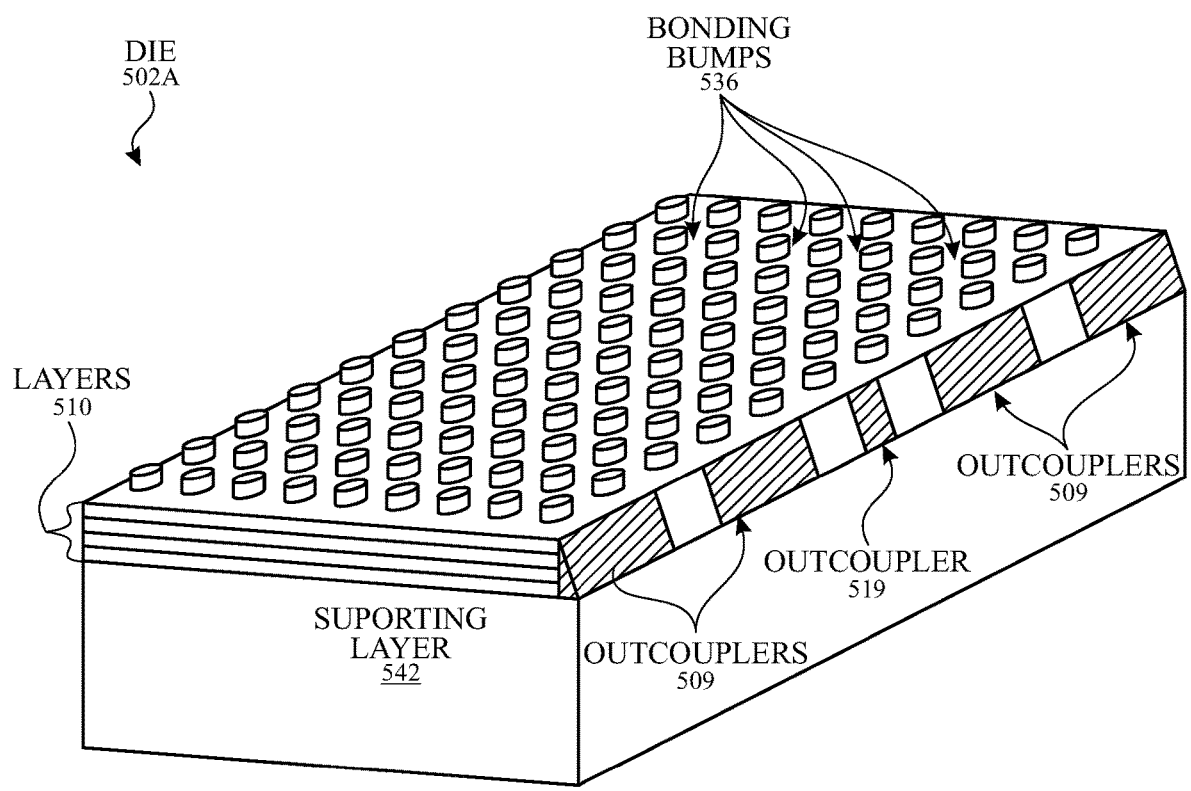

A reflective material can optionally be deposited on the outcoupler 509 to form a reflector 511 (step 412 of process 400). A plurality of bonding bumps 536 can be formed on the layers 510 (step 414 of process 400). FIGS. 5H-5J illustrate cross-sectional, top, and planar views, respectively, of the die 502A after the bonding bumps are formed on the layers according to examples of the disclosure.

In some examples, the die can include a plurality of outcouplers, as illustrated in the top and planar views of FIGS. 5I-5J, respectively. For example, die 502A can include outcouplers 509 and outcoupler 519. The outcouplers included in a single die can have different properties (e.g., materials, size, shape, polish angle, etc.). In some instances, one type of outcoupler (e.g., outcoupler 509) can be configured for one type of measurement (e.g., the measurement involving light that interacts with the measured sample volume), and another type of outcoupler (e.g., outcoupler 519) can be configured for another type of measurement (e.g., the measurement involving a reference detector used to account for drift in the optical components such as the light emitter).

Figure 5K:
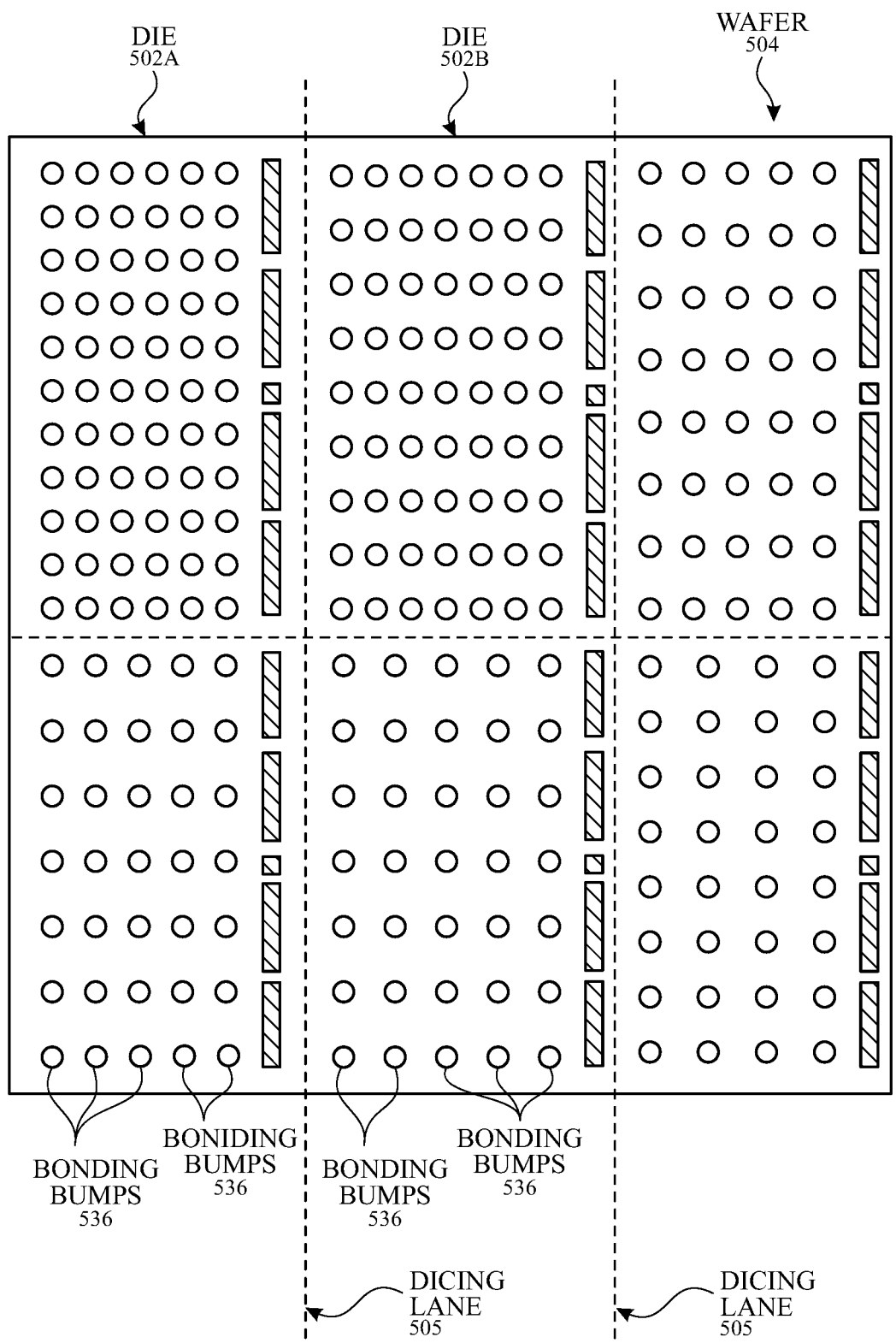
FIG. 5K illustrates a top view of a wafer including multiple dies having the bonding bumps formed on the layers of the multiple dies according to examples of the disclosure.

Although the above figures illustrate the bonding bumps formed after separating the dies via a dicing step, examples of the disclosure can include separating the dies after the bonding bumps are formed on the layers. As illustrated in the top view shown in FIG. 5K, the wafer 504 can include a plurality of dies, such as die 502A and die 502B. The bonding bumps 536 can be formed on the plurality of dies prior to dicing along the dicing lanes 505. In some examples, after the dies are separated via the dicing step, one or more encapsulation layers can be deposited over the bonding bumps to maintain the integrity of the bonding bumps during the step of polishing the outcoupler(s).

The die can be flipped over and bonded to an interposer (e.g., interposer 241 illustrated in FIG. 2A) (step 416 of process 400). One or more optics (e.g., optics 219 illustrated in FIG. 2A) and layers (e.g., layers 219 illustrated in FIG. 2A) may be formed on the top (e.g., closest to the system interface) side of the supporting layer (e.g., supporting layer 242 illustrated in FIG. 2A) (step 418 of process 400). In some examples, the optics can be one or more microlenses formed by etching the supporting layer. The thermal slug(s) (e.g., thermal slug 232 illustrated in FIG. 2A) may be bonded to the supporting layer (e.g., supporting layer 242 illustrated in FIG. 2A) using one or more solder connections (e.g., solder connection 234 illustrated in FIG. 2A) (step 420 of process 400). The detector array (e.g., detector array 230 illustrated in FIG. 2A) may be placed on top of the layers (e.g., layers 219 illustrated in FIG. 2A) (step 422 of process 400). The thermal slug may also be bonded to the windows (e.g., windows 201 illustrated in FIG. 2A) using a thermally conductive epoxy (not shown) (step 424 of process 400). The frame (e.g., frame 214 illustrated in FIG. 2A) may be bonded to the supporting layer (e.g., supporting layer 242 illustrated in FIG. 2A) and a hermetical seal can be created (step 426 of process 400).

Figure 6A:
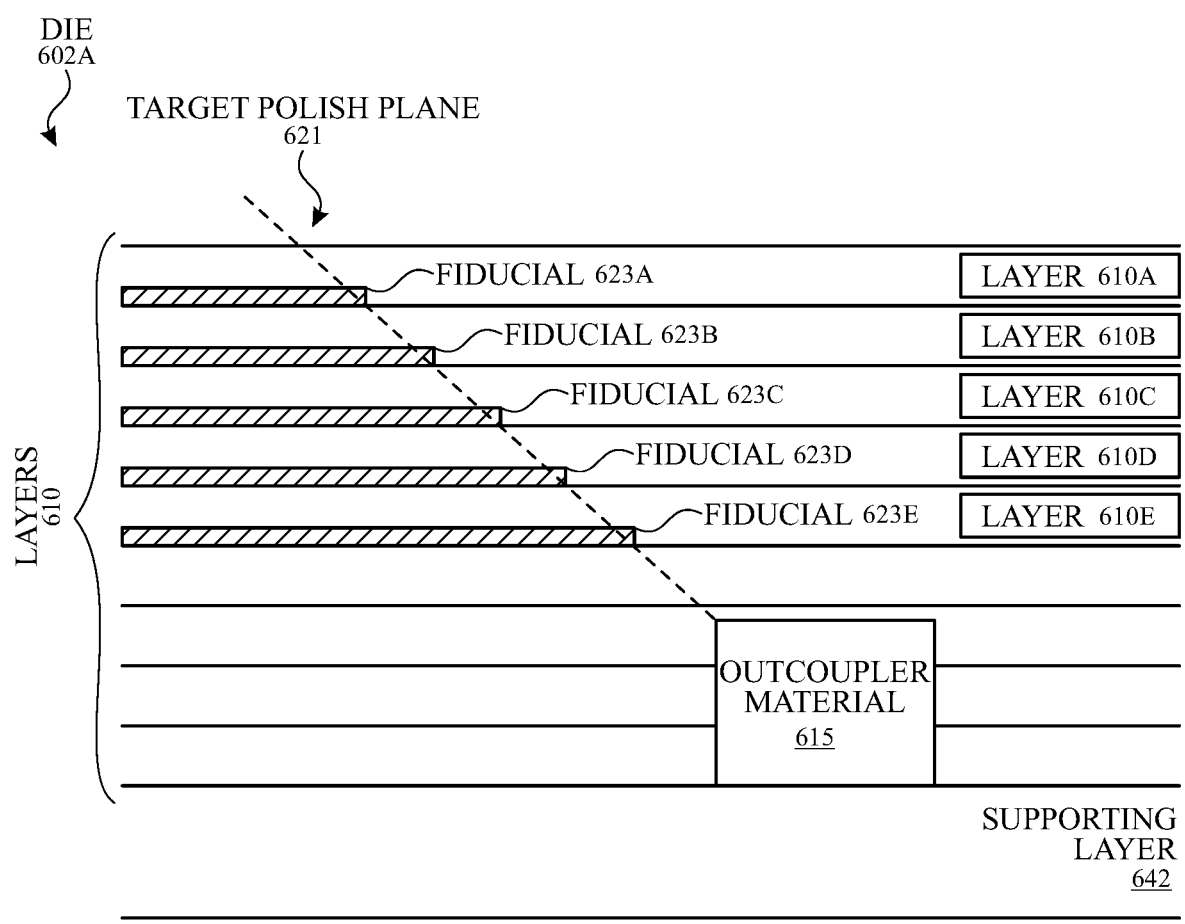
FIGS. 6A-6C illustrate cross-sectional and top views of fiducials included in an integrated photonics device according to examples of the disclosure.
Figure 6B:
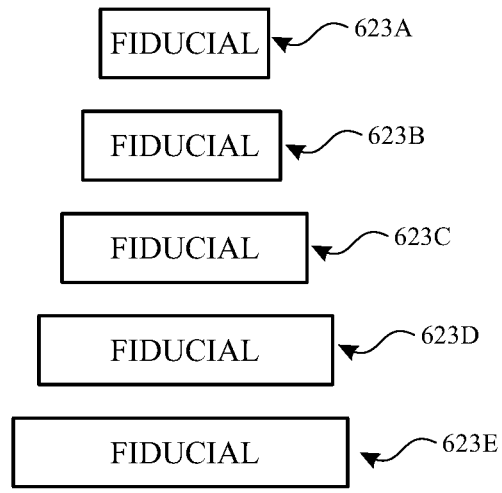

Examples of the disclosure further include using one or more fiducials in the polishing step (e.g., step 410 illustrated in FIG. 4) for control of the depth and angle of the polished edge(s) of the outcoupler(s). FIGS. 6A-6B illustrate cross-sectional and top views, respectively, of the fiducials included in the layers of an integrated photonics device according to examples of the disclosure. The die 602A can include a plurality of fiducials 623. The fiducials 623 can allow a given target polish plane 621 to be achieved during the polishing step. One or more fiducials may not be visible until a given amount material has been removed. For example, in polishing the layers 610, the fiducial 623A can become visible once a certain amount of layer 610A is polished. If the target polish depth is deeper, the polishing step can continue to remove a given amount of material from layer 610B until the fiducial 623B becomes visible, and so on.

The fiducials 623 can be included in the layers, where the number and depth from the topmost layer can be based on the target polish depth. For example, if the target polish depth is located at 5 um, and layer 610D is also at 5 um, then the exposure of the fiducial 623E would be an indication that the target polish depth has been reached.

Additionally, the fiducials can have certain horizontal locations based on the target polish angle. For example, the ends of the fiducials 623 can form a plane that is angled at the given target polish angle. If the target polish angle changes, the horizontal offset of the fiducials can be changed accordingly. Generally, a smaller offset can be used for steeper target polish angles. In some examples, the fiducials 623 may have one edge that is vertically aligned, but may have another edge that is not (e.g., the fiducials 623 may not be the same length).

Figure 6C:
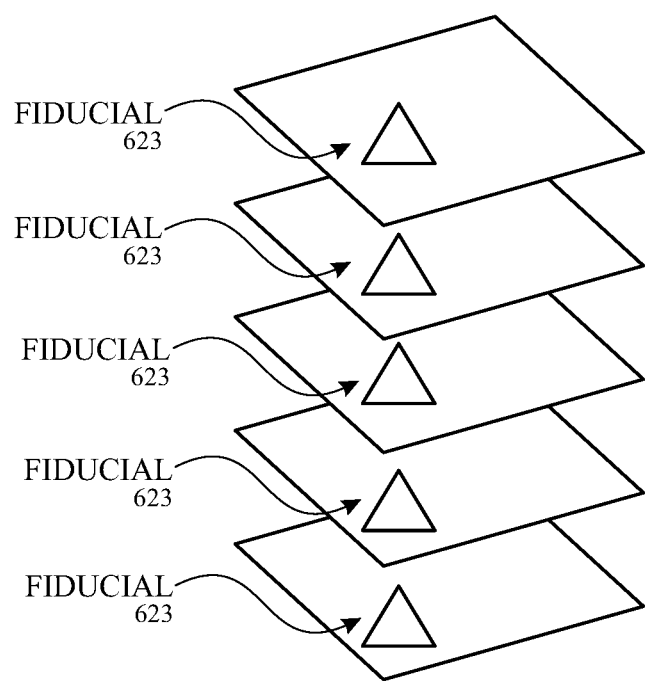

The fiducials 623 can be made of any material that is at least partially opaque and can be included in the layers 610. An exemplary material is metal. The fiducials 623 can be arranged, shaped, and/or sized according to a given target polish plane 621. FIG. 6B illustrates fiducials 623 that are rectangular, and FIG. 6C illustrates fiducials that are triangular. Additionally, examples of the disclosure can include two or more fiducials that have different sizes, shapes, materials, or other properties. For example, as shown in FIG. 6B, the fiducials 623 can be different lengths. In some instances, the die can include multiple sets of fiducials. For example, one set of fiducials can be located at multiple corners of a square or rectangular die. The sets of fiducials can be the same, or in some instances, may be oriented differently. For example, one set of fiducials can include triangles whose vertex is oriented in one direction, and another set of fiducials can include triangles whose base is oriented in the same direction.

Figure 7A:
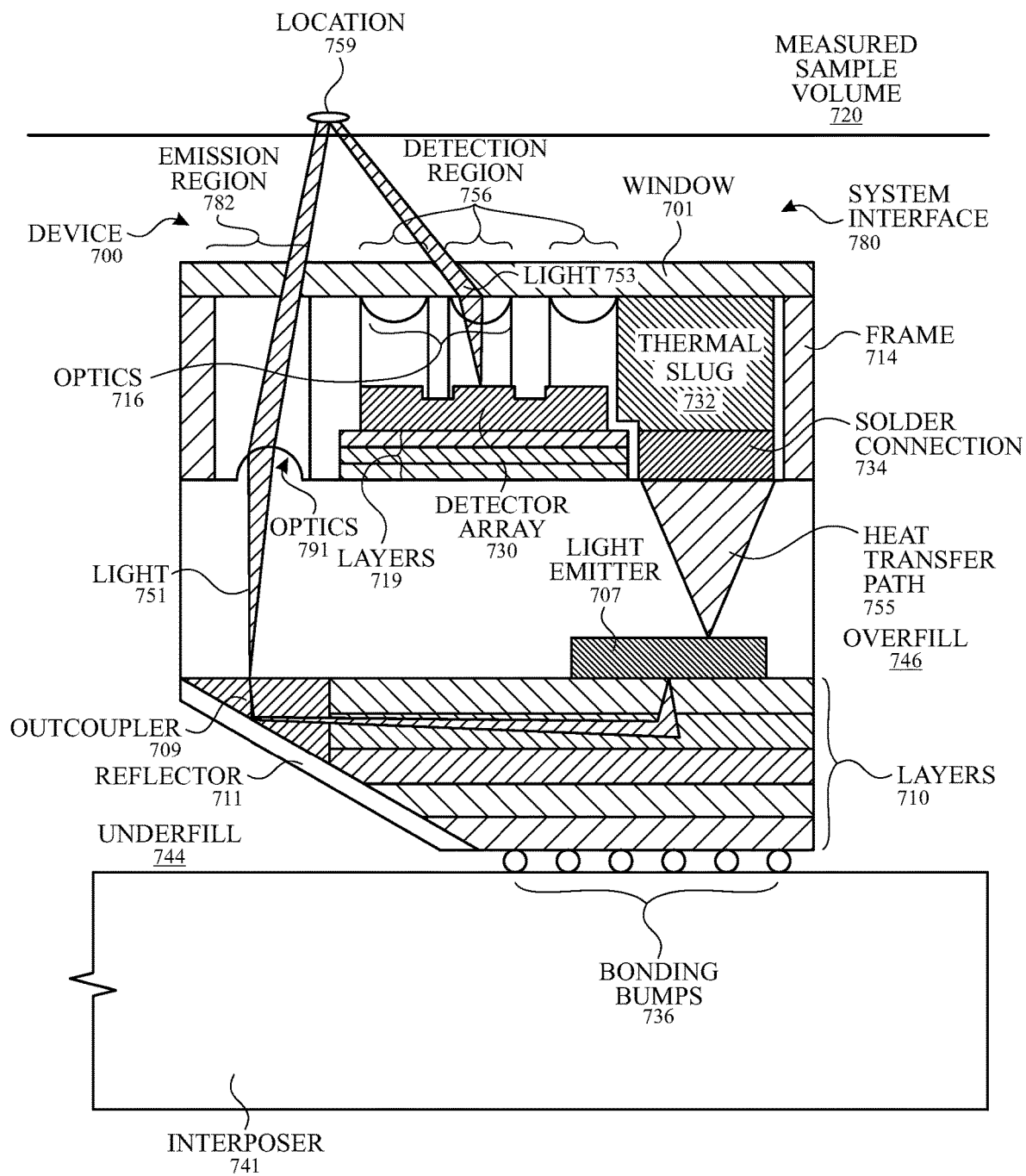
FIG. 7A illustrates an exemplary integrated device for determining the properties of a sample according to examples of the disclosure.
Figure 7B:
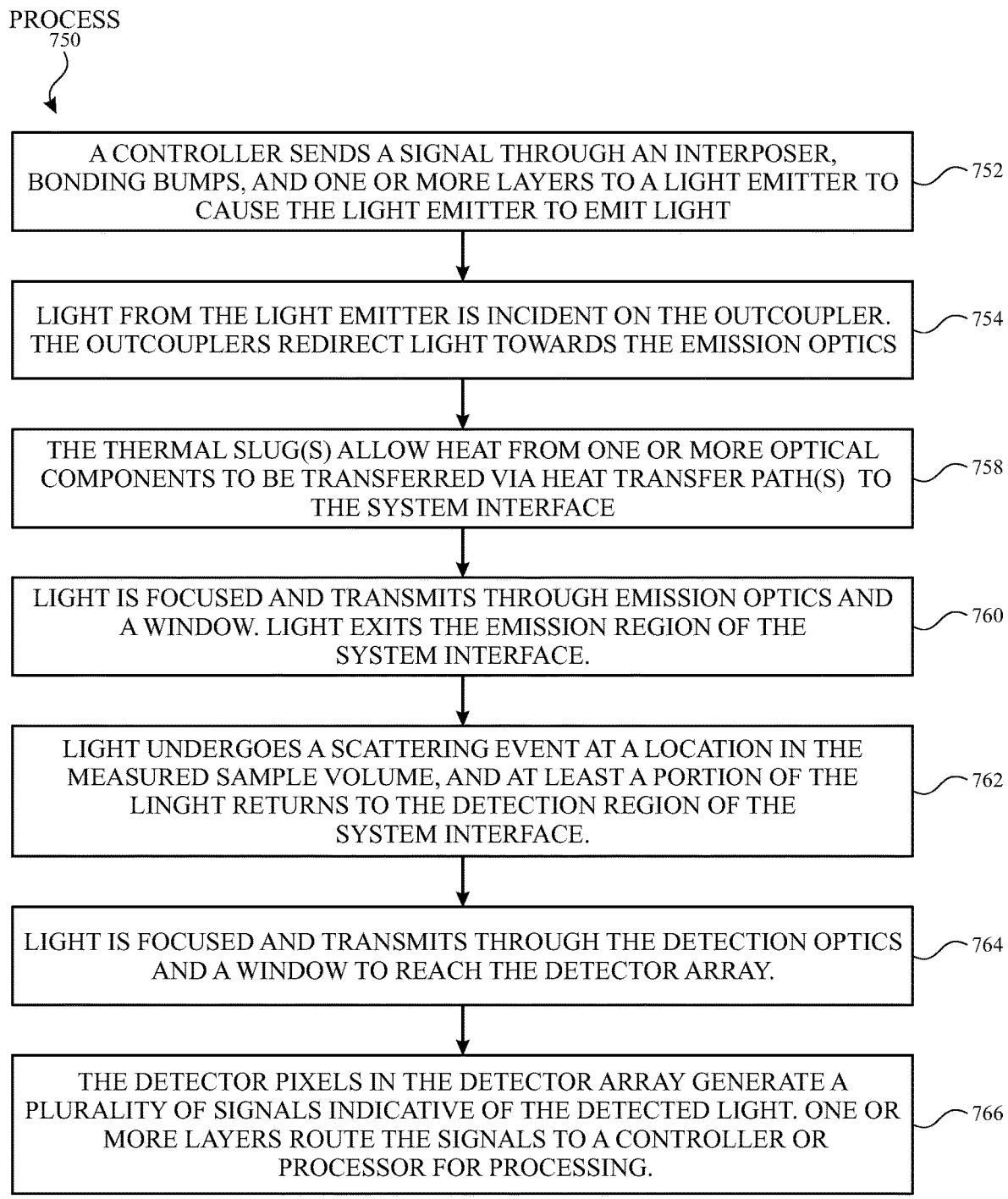
FIG. 7B illustrates an exemplary method for determining the properties of a sample using the integrated device according to examples of the disclosure.

A method for operating the device to determine one or more properties of a sample is now discussed. FIG. 7A illustrates an exemplary device and FIG. 7B illustrates an exemplary method for determining the properties of a sample according to examples of the disclosure. The device 700 can have one or more components and/or functions similar to those discussed above in the context of device 200, device 300, and/or process 400. A controller (not shown) can send one or more signals through an interposer 741, bonding bumps 736, and one or more layers 710 to a light emitter 707 (step 752 of process 750). The one or more signals from the controller can cause the light emitter 707 to emit light. Light from the light emitter 707 can propagate through the waveguide created by layers 710 to the outcoupler 709 (step 754 of process 750). The outcoupler 709 can redirect the light 751 towards the emission optics 791. Before, during, and/or after, a thermal slug 732 can allow heat from one or more optical components (e.g., the light emitter 707) to be transferred via one or more heat transfer paths 755 to the system interface 790.

The emission optics 791 can direct, collimate, and/or focus light 751 towards the emission region 782 and through window 701 (step 760 of process 750). Light 751 can undergo a scattering event at location 759 of the measured sample volume 720 (step 762 of process 750). At the scattering event, the light can return to the device 700 as light 753. Light 753 can transmit through window 701. The detection optics 716 can direct, collimate, and/or focus light 753 towards the detector array 730 (step 764 of process 750). The detector pixels in the detector array 730 can generate a plurality of signals indicative of the detected light, and layers 719 can route the signals to a controller or a processor for processing (step 766 of process 750). The signals can be routed out of the hermetically sealed enclosure to another board (e.g., board 243 illustrated in FIG. 2A).

In some examples, at least one of the outcouplers can be configured for redirecting light (i.e., a reference light beam) to a reference detector. The reference detector can be used to reduce the amount of drift from the light emitter that is included in the measurement signal(s). For example, the outcoupler 519 illustrated in FIG. 5J can be a reference outcoupler configured for redirecting light to a reference detector. The light emitted by the light emitter(s) can be split using an optical splitter, for example, where a certain percentage of the emitted light can be directed at the reference outcoupler. The reference outcoupler can direct the light to a reference detector, without directing the light to optics (e.g., optics 291 and/or optics 216 illustrated in FIG. 2A), an emission region (e.g., emission region 282 illustrated in FIG. 2A), or detection regions (e.g., detection regions 256 illustrated in FIG. 2A). In some examples, the detector array (e.g., detector array 230) can include a reference detector (not shown), which can have its active area oriented towards the reference outcoupler. In some instances, the active area of the reference detector can be oriented in a different direction than the active areas of the remainder detectors. In some examples, a reflector can be included in the device in the optical path of the reference light beam to direct the light from the reference outcoupler to the reference detector.

Representative applications of methods and apparatus according to the present disclosure are described in this section. These examples are being provided solely to add context and aid in the understanding of the described examples. It will thus be apparent to one skilled in the art that the described examples may be practiced without some or all of the specific details. Other applications are possible, such that the following examples should not be taken as limiting.

An integrated photonics device is disclosed. The integrated photonics device can include: a supporting layer including a first side and a second side; one or more windows located at a system interface of the integrated photonics device; optics configured to redirect, focus, and/or collimate incident light to or from the one or more windows; one or more edge outcouplers configured to redirect light towards at least some of the optics; one or more light emitters configured to emit light in response to first signals, where the emitted light is incident on the one or more edge outcouplers; a plurality of first layers deposited on the first side of the supporting layer, wherein the plurality of first layers is configured to route the first signals from a controller to the one or more light emitters; one or more detectors configured to detect return light and generate second signals indicative of the detected return light, wherein the detected return light includes at least a portion of the emitted light; a plurality of second layers deposited on the second side of the supporting layer, wherein the plurality of second layers is configured to route second signals from the one or more detectors to the controller or a processor; and the controller or a processor configured to determine one or more sample properties based on the second signals. Additionally or alternatively, in some examples, the integrated photonics device further comprises: a frame connected to the supporting layer, wherein the frame is configured to create a hermetic seal around at least the one or more detectors and at least some of the optics. Additionally or alternatively, in some examples, the integrated photonics device further comprises: one or more traces electrically connected to the one or more second layers, wherein the one or more traces are configured to route the second signals to a location outside of the hermetic seal. Additionally or alternatively, in some examples, the integrated photonics device of claim 1, further comprises one or more thermal slugs configured to relocate heat from one location to another, the one or more thermal slugs thermally coupled to the supporting layer and the one or more windows. Additionally or alternatively, in some examples, the one or more thermal slugs are located around the one or more optics. Additionally or alternatively, in some examples, the integrated photonics device further comprises: one or more solder connections configured to connect the one or more thermal slugs to the supporting layer, wherein the one or more solder connections are located in locations corresponding to the one or more light emitters. Additionally or alternatively, in some examples, the one or more edge outcouplers includes an outcoupler material, the outcoupler material including amorphous silicon, the supporting layer includes silicon, and the plurality of first layers includes silicon and silicon dioxide. Additionally or alternatively, in some examples, the plurality of first layers includes one or more of insulating layer(s) and conductive layer(s), at least some of the plurality of first layers including a plurality of fiducials, wherein at least two of the plurality of fiducials are offset relative to one another, the offset based on a target polishing plane. Additionally or alternatively, in some examples, the integrated photonics device further comprises: a plurality of second fiducials, wherein the plurality of second fiducials is oriented along a different direction than the plurality of fiducials. Additionally or alternatively, in some examples, the optics are one-layer optics.

A method for determining one or more properties of a sample using an integrated photonics device is disclosed. The method can comprise: emitting light from one or more light emitters towards one or more waveguides; propagating the emitted light using the one or more waveguides to one or more edge outcouplers, the one or more waveguides formed from at least some of a plurality of first layers; redirecting the emitted light using the one or more edge outcouplers towards optics; redirecting, focusing, and/or collimating the redirected light using the optics towards one or more windows of the integrated photonics device; receiving return light from the one or more windows by one or more detectors; generating second signals indicative of the return light using the one or more detectors; and determining the one or more properties of the sample based on the second signals. Additionally or alternatively, in some examples, the method further comprises: creating a hermetic seal around at least the one or more detectors and the one or more windows. Additionally or alternatively, in some examples, the method further comprises: routing the second signals from the one or more detectors to a controller located outside of the hermetic seal. Additionally or alternatively, in some examples, the method further comprises: routing first signals from a controller using one or more of an interposer and bonding bumps; and transmitting first signals to the one or more light emitters, the first signals associated with the emitted light from the one or more light emitters. Additionally or alternatively, in some examples, the method further comprises: relocating heat from the one or more light emitters to the one or more windows using one or more thermal slugs.

A method for forming an integrated photonics device is disclosed. The method can comprise: providing a wafer, the wafer including a supporting layer and a plurality of first layers on a first side of the supporting layer; and forming one or more integrated edge outcouplers including: forming one or more pockets by etching the plurality of first layers, growing outcoupler material in the one or more pockets, and polishing at least one edge of wafer along a target polish plane, wherein the polish exposes at a least a portion of the outcoupler material. Additionally or alternatively, in some examples, forming the one or more integrated edge outcouplers further comprises: depositing additional material on top of the outcoupler material prior to the polishing. Additionally or alternatively, in some examples, forming the one or more integrated edge outcouplers further comprises: depositing a plurality of fiducials in the plurality of layers such that the plurality of fiducials is offset with respect to one another to form the target polish plane. Additionally or alternatively, in some examples, the method further comprises: forming a plurality of second layers on a second side of the supporting layer; forming a detector array on the plurality of second layers; connecting a frame to the supporting layer; and creating a hermetic seal using the frame. Additionally or alternatively, in some examples, the method further comprises: forming one or more light emitters on the first side of the supporting layer; forming one or more solder connections in locations corresponding to the one or more light emitters; forming one or more thermal slugs; and thermally coupling the one or more thermal slugs to the supporting layer using the one or more solder connections.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

The invention claimed is:

1. An integrated photonics device including:
a supporting layer including a first side and a second side;
one or more windows located at a system interface of the integrated photonics device;
optics configured to redirect, focus, and/or collimate incident light to or from the one or more windows;
one or more edge outcouplers configured to redirect light towards at least some of the optics;
one or more light emitters configured to emit light in response to first signals, where the emitted light is incident on the one or more edge outcouplers;
a plurality of first layers deposited on the first side of the supporting layer, wherein the plurality of first layers is configured to route the first signals from a controller to the one or more light emitters;
one or more detectors configured to detect return light and generate second signals indicative of the detected return light, wherein the detected return light includes at least a portion of the emitted light;
a plurality of second layers deposited on the second side of the supporting layer, wherein the plurality of second layers is configured to route second signals from the one or more detectors to the controller or a processor; and
the controller or the processor configured to determine one or more sample properties based on the second signals.

2. The integrated photonics device of claim 1, further comprising:
a frame connected to the supporting layer, wherein the frame is configured to create a hermetic seal around at least the one or more detectors and at least some of the optics.

3. The integrated photonics device of claim 2, further comprising:
one or more traces electrically connected to the one or more second layers, wherein the one or more traces are configured to route the second signals to a location outside of the hermetic seal.

4. The integrated photonics device of claim 1, further comprising:
one or more thermal slugs configured to relocate heat from one location to another, the one or more thermal slugs thermally coupled to the supporting layer and the one or more windows.

5. The integrated photonics device of claim 4, wherein the one or more thermal slugs are located around the one or more optics.

6. The integrated photonics device of claim 4, further comprising:
one or more solder connections configured to connect the one or more thermal slugs to the supporting layer, wherein the one or more solder connections are located in locations corresponding to the one or more light emitters.

7. The integrated photonics device of claim 1, wherein:
the one or more edge outcouplers includes an outcoupler material, the outcoupler material including amorphous silicon,
the supporting layer includes silicon, and
the plurality of first layers includes silicon and silicon dioxide.

8. The integrated photonics device of claim 1, wherein the plurality of first layers includes one or more of insulating layer(s) and conductive layer(s),
at least some of the plurality of first layers including a plurality of fiducials, wherein at least two of the plurality of fiducials are offset relative to one another, the offset based on a target polishing plane.

9. The integrated photonics device of claim 8, further comprising:
a plurality of second fiducials, wherein the plurality of second fiducials is oriented along a different direction than the plurality of fiducials.

10. The integrated photonics device of claim 1, wherein the optics are one-layer optics.

11. A method for determining one or more properties of a sample using an integrated photonics device, the method comprising:

emitting light towards one or more waveguides located on a first side of a supporting layer;

propagating the emitted light using the one or more waveguides to one or more edge outcouplers, the one or more waveguides formed from at least some of a plurality of first layers;

redirecting the emitted light using the one or more edge outcouplers towards optics;

redirecting, focusing, and/or collimating the redirected light using the optics towards one or more windows of the integrated photonics device;

receiving return light from the one or more windows by one or more detectors located on a second side of the supporting layer;

generating second signals indicative of the return light using the one or more detectors; and determining the one or more properties of the sample based on the second signals.

12. The method of claim 11, further comprising:
creating a hermetic seal around at least the one or more detectors and the one or more windows.

13. The method of claim 12, further comprising:
routing the second signals from the one or more detectors to a controller located outside of the hermetic seal.

14. The method of claim 11, further comprising:
routing first signals from a controller using one or more of an interposer and bonding bumps; and
transmitting first signals to the one or more light emitters, the first signals associated with the emitted light from the one or more light emitters.

15. The method of claim 11, further comprising:
relocating heat from the one or more light emitters to the one or more windows using one or more thermal slugs.

16. A method for forming an integrated photonics device, the method comprising:

providing a wafer, the wafer including a supporting layer and a plurality of first layers on a first side of the supporting layer; and forming one or more integrated edge outcouplers including:

forming one or more pockets by etching the plurality of first layers, forming a plurality of second layers on a second side of the supporting layer, forming a detector array on a second side of the supporting layer, growing outcoupler material in the one or more pockets, and polishing at least one edge of wafer along a target polish plane, wherein the polish exposes at a least a portion of the outcoupler material.

17. The method of claim 16, wherein forming the one or more integrated edge outcouplers further comprises:
depositing additional material on top of the outcoupler material prior to the polishing.

18. The method of claim 16, wherein forming the one or more integrated edge outcouplers further comprises:
depositing a plurality of fiducials in the plurality of layers such that the plurality of fiducials is offset with respect to one another to form the target polish plane.

19. The method of claim 16, further comprising:
connecting a frame to the supporting layer; and
creating a hermetic seal using the frame.

20. The method of claim 16, further comprising:
forming one or more light emitters on the first side of the supporting layer;
forming one or more solder connections in locations corresponding to the one or more light emitters;
forming one or more thermal slugs; and
thermally coupling the one or more thermal slugs to the supporting layer using the one or more solder connections.

* * * * *